United States Patent

Child et al.

(10) Patent No.: US 10,127,754 B2
(45) Date of Patent: Nov. 13, 2018

(54) IDENTIFICATION-BASED BARRIER TECHNIQUES

(71) Applicant: Vivint, Inc., Provo, UT (US)

(72) Inventors: Michael D. Child, Lehi, UT (US); Michelle Zundel, Draper, UT (US); Tanner Potter, Provo, UT (US); Scott Moulton, Oakley, UT (US)

(73) Assignee: Vivint, Inc., Provo, UT (US)

( * ) Notice: Subject to any disclaimer, the term of this patent is extended or adjusted under 35 U.S.C. 154(b) by 92 days.

(21) Appl. No.: 15/093,189

(22) Filed: Apr. 7, 2016

(65) Prior Publication Data

US 2016/0217638 A1    Jul. 28, 2016

Related U.S. Application Data

(63) Continuation-in-part of application No. 14/262,506, filed on Apr. 25, 2014.

(51) Int. Cl.
G05B 23/00 (2006.01)
B60R 25/00 (2013.01)
(Continued)

(52) U.S. Cl.
CPC ......... *G07C 9/00563* (2013.01); *G05B 15/02* (2013.01); *G07C 9/00158* (2013.01); *H04L 12/2803* (2013.01); *H04L 12/2827* (2013.01)

(58) Field of Classification Search
CPC ....... G05B 23/00; B60R 25/00; G06F 3/0346; G06F 3/01; G06F 21/31; G06F 21/32
(Continued)

(56) References Cited

U.S. PATENT DOCUMENTS 3,790,944 A    2/1974  Yarwood
6,867,683 B2 *  3/2005  Calvesio ............ G07C 9/00087
                                                        340/5.52
(Continued)

FOREIGN PATENT DOCUMENTS

DE    201310103535 A1    4/2013
JP       2007262695 A   10/2007
(Continued)

OTHER PUBLICATIONS

PCT International Search Report for International Application No. PCT/US2017/026135, dated May 31, 2017 (3 pp.).
(Continued)

*Primary Examiner* — Nam V Nguyen
(74) *Attorney, Agent, or Firm* — Holland & Hart LLP

(57) ABSTRACT

Methods and systems are described for controlling access to a home based on user occupancy. According to at least one embodiment, an apparatus for controlling access to a home based on user occupancy includes a processor, a memory in electronic communication with the processor, and instructions stored in the memory which are executable by a processor to determine a location of a user of a home automation system relative to a barrier of a home being monitored by the home automation system. The instructions are executable to determine whether to permit a change in a locking mechanism of the barrier based in part on the determined location of the user, and maintain a current state of the home automation system.

18 Claims, 13 Drawing Sheets

(51) Int. Cl.
*G06F 3/01* (2006.01)
*G06F 21/31* (2013.01)
*G06F 21/32* (2013.01)
*E05B 47/00* (2006.01)
*G07C 9/00* (2006.01)
*G05B 15/02* (2006.01)
*H04L 12/28* (2006.01)

(58) Field of Classification Search
USPC ........ 340/5.61, 5.1, 5.72; 345/158; 382/103, 382/118, 289
See application file for complete search history.

(56) References Cited

U.S. PATENT DOCUMENTS

| | | | |
|---|---|---|---|
| 7,131,132 B1 * | 10/2006 | Gehlot | G06F 21/32 725/10 |
| 7,366,329 B2 * | 4/2008 | Ono | G07C 9/00158 382/115 |
| 7,971,156 B2 * | 6/2011 | Albertson | G06F 21/35 715/863 |
| 8,339,271 B2 | 12/2012 | Tabib | |
| 8,542,879 B1 * | 9/2013 | Nechyba | G06K 9/00228 382/103 |
| 8,750,576 B2 | 6/2014 | Huang et al. | |
| 8,780,201 B1 | 7/2014 | Scalisi et al. | |
| 8,988,350 B2 * | 3/2015 | Karmarkar | G06F 3/013 345/158 |
| 9,014,546 B2 | 4/2015 | Shimy et al. | |
| 9,057,210 B2 * | 6/2015 | Dumas | G07C 9/00571 |
| 9,269,012 B2 * | 2/2016 | Fotland | G06K 9/3241 |
| 9,317,985 B2 * | 4/2016 | Tehranchi | G07C 9/00309 |
| 9,443,365 B2 | 9/2016 | Ahearn et al. | |
| 9,573,541 B2 * | 2/2017 | Graumann | G06K 9/00369 |
| 9,596,084 B2 * | 3/2017 | Papakipos | G06F 1/1686 |
| 9,721,383 B1 * | 8/2017 | Horowitz | G06T 17/20 |
| 9,866,820 B1 * | 1/2018 | Agrawal | H04N 13/0246 |
| 9,911,361 B2 * | 3/2018 | Wexler | G09B 21/008 |
| 2004/0151347 A1 | 8/2004 | Wisniewski | |
| 2004/0153671 A1 | 8/2004 | Schuyler et al. | |
| 2006/0176146 A1 | 8/2006 | Krishan et al. | |
| 2007/0290793 A1 | 12/2007 | Tran | |
| 2008/0285802 A1 | 11/2008 | Bramblet et al. | |
| 2009/0051528 A1 | 2/2009 | Graichen | |
| 2010/0097225 A1 | 4/2010 | Petricoin, Jr. | |
| 2010/0283579 A1 | 11/2010 | Kraus et al. | |
| 2010/0289644 A1 | 11/2010 | Slavin et al. | |
| 2011/0091080 A1 * | 4/2011 | Gamliel | G06K 9/00241 382/118 |
| 2011/0263946 A1 * | 10/2011 | el Kaliouby | A61B 5/1128 600/300 |
| 2012/0088581 A1 * | 4/2012 | Mao | G06K 9/00281 463/32 |
| 2012/0280783 A1 | 11/2012 | Gerhardt et al. | |
| 2012/0326868 A1 | 12/2012 | Goel | |
| 2014/0049361 A1 | 2/2014 | Ahearn et al. | |
| 2014/0049369 A1 | 2/2014 | Ahearn et al. | |
| 2014/0226861 A1 * | 8/2014 | Zhang | G06K 9/6218 382/103 |
| 2015/0309487 A1 | 10/2015 | Lyman | |
| 2015/0363986 A1 | 12/2015 | Hoyos et al. | |

FOREIGN PATENT DOCUMENTS

| | | |
|---|---|---|
| KR | 10-2006-0083557 | 7/2006 |
| KR | 1020160006554 A | 1/2016 |
| WO | 2002008022 A2 | 1/2002 |

OTHER PUBLICATIONS

International Search Report and Written Opinion of the International Searching Authority for PCT/US2015/026921, dated Jul. 21, 2015.
Machine translation of KR 10-2006-0083557, dated Jul. 21, 2006.
"Fingertec faceid," FingerTech, Mar. 31, 2011, http://www.fingertec.com/images/w_brochure/FaceID3_e.html.
Supplementary European Search Report for EP Application No. 15782833, dated Sep. 13, 2017 (2 pp.).

* cited by examiner

IDENTIFICATION-BASED BARRIER TECHNIQUES

CROSS-REFERENCE TO RELATED APPLICATIONS

This application is a continuation-in-part of U.S. patent application Ser. No. 14/262,506, titled: "MANAGING HOME AUTOMATION SYSTEM BASED ON OCCUPANCY," filed on Apr. 25, 2014.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, opportunities exist for simplifying the user's interface with the home automation and security system and providing improved automated control.

SUMMARY

Methods and systems are described for controlling access to a home based on user occupancy. According to at least one embodiment, an apparatus for controlling access to a home based on user occupancy includes a processor, a memory in electronic communication with the processor, and instructions stored in the memory which are executable by a processor to determine a location of a user of a home automation system relative to a barrier of a home being monitored by the home automation system. The instructions are executable to determine whether to permit a change in a locking mechanism of the barrier based in part on the determined location of the user, and maintain a current state of the home automation system.

In one example, the instructions may be executable by the processor to determine an identity of the user, wherein determining whether to permit the change in the locking mechanism of the barrier is based in part on the identity of the user. The state of the home automation system may be an active or armed state. Determining a location of the user may include determining whether the user is inside or outside of the home. Determining a location of the user may include determining on which side of the barrier the user is positioned. The barrier may be one of a door or a window of the home, and the change in the locking mechanism may include locking or unlocking the locking mechanism to control opening of the door or window. Determining the location of the user may include determining whether the user is touching an inside handle used to control opening the barrier or an outside handle used to control opening of the barrier. Determining whether to permit a change in the locking mechanism of the barrier may include unlocking the locking mechanism if the user is inside the house. Determining whether to permit a change in the locking mechanism of the barrier may include unlocking the locking mechanism if the user is located inside or outside the home and is identified as an authorized person, and maintaining the barrier locked if the user is located inside or outside the home and is identified as an unauthorized person. The instructions may be executable by the processor to generate an alarm when the user is identified as an unauthorized person and attempts to open the barrier from outside of the home. Determining a location of a user may include receiving signals from at least one of a touch sensor, a voice recognition sensor, a motion sensor, and an optical sensor.

Another embodiment relates to a computer-program product for controlling access to a home based on user occupancy. The computer-program product may include a non-transitory computer-readable medium storing instructions executable by a processor to determine a location of a user of a home automation system relative to a barrier of a home being monitored by the home automation system. The instructions are executable to determine an identity of the user, determine whether to permit a change in a locking mechanism of the barrier based in part on the determined location of the user and the identity of the user, and maintain a current state of the home automation system.

In one example, maintaining a current state may include maintaining the home automation system in a constant active state. Determining whether to permit a change in the locking mechanism of the barrier may include unlocking the locking mechanism if the user is located inside or outside the home and is identified as an authorized person, and maintaining the barrier locked if the user is located outside the home and is identified as an unauthorized person. Determining a location of the user may include determining if the user is touching an inside handle or an outside handle used to open the barrier. Determining an identity of the user may include receiving a signal from an electronic device carried by the user.

A further embodiment is directed to a computer-implemented method for controlling access to a home based on user occupancy. The method includes determining a location of a user of a home automation system relative to a barrier of a home being monitored by the home automation system, determining an identity of the user, determining whether to permit opening the barrier based in part on the determined location and identity of the user, and maintaining an active state of the home automation system.

In one example, the method further includes unlocking a locking mechanism of the barrier when the user is identified as an authorized user, and locking the locking mechanism when the user is identified as an unauthorized user. The method may include unlocking a locking mechanism of the barrier when the user is determined to be located on one side of the barrier, and locking the locking mechanism when the user is determined to be located on an opposite side of the barrier. Determining a location of the user may include determining use of a handle assembly used to open the barrier.

Another method for security and/or automation systems for controlling access to a home is also disclosed. According to at least on embodiment, the method may include determining an identity of a first user outside a home, determining a designation of the first user based at least in part on the determined identity of the first user, and/or initiating a change of a lock of a barrier based at least in part on the determined designation of the first user.

In some embodiments, initiating the change of the lock may be based at least in part on receiving a current lock position and evaluating the current lock position based at least in part on the determined designation. In some embodiments, initiating the change of the lock may include adjusting the lock.

In some embodiments, determining the identity of the first user may include evaluating whether a query relating to the first user satisfies a threshold level of certainty. In some embodiments, evaluating may be based at least in part on a weighted comparison of a changeable feature. In one example, the changeable feature may include any of a hair color, or a hair style, or a hair length, or eye glasses, or an eye color, or a hat, or clothing, or a combination thereof. In some embodiments, determining the identity of the first user may be based at least in part on detecting a portable device associated with the first user.

In some embodiments, determining the identity of the first user may be based at least in part on a facial recognition of the first user. In a further embodiment, a camera relating to the facial recognition may be hidden from a view at the barrier. In a further embodiment, the facial recognition may include detecting a face of the first user in a camera's field of view, and tracking the face as the first user moves in the camera's field of view. In another embodiment, the facial recognition may include determining if a facial feature is present in a camera's field of view, and capturing a first image based at least in part on determining if the facial feature is present. In a further embodiment, the method may include detecting an ambient light level, and illuminating a facial feature of a user based on the detected ambient light level as part of the facial recognition.

In some embodiments, the method may further include determining an identity of a second user, determining a designation of the second user based at least in part on the determined identity of the second user, and initiating the change of the lock of the barrier based at least in part on the determined designation of the first user and the determined designation of the second user.

In some embodiments, determining the identity of the first user may be based at least in part on receiving a first image and a second image of the first user. In one example, the first image and the second image may include any of picture data, or video data, or a combination thereof. In another example, the first image may be based on a first viewpoint and the second image may be based on a second viewpoint different from the first viewpoint. In a further example, the first image may be received from a first camera, and the second image may be received from a second camera. In a further example, the first camera and the second camera may be separated by a predetermined distance, and the first camera may capture the first image at a first distance away from the barrier, and the second camera may capture the second image a second distance away from the barrier. In a further example, determining the identity may include comparing the first image, or the second image, or a combination thereof with a database of identifying information. In a further example, the first image or the second image, and the identifying information may include any of: an image of a skin patch, or a geometry of facial features, or a facial image of a user with an expression, or a facial image of a user with a perspective, or a height, or a weight, or a voice, or a body feature, or a key code, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
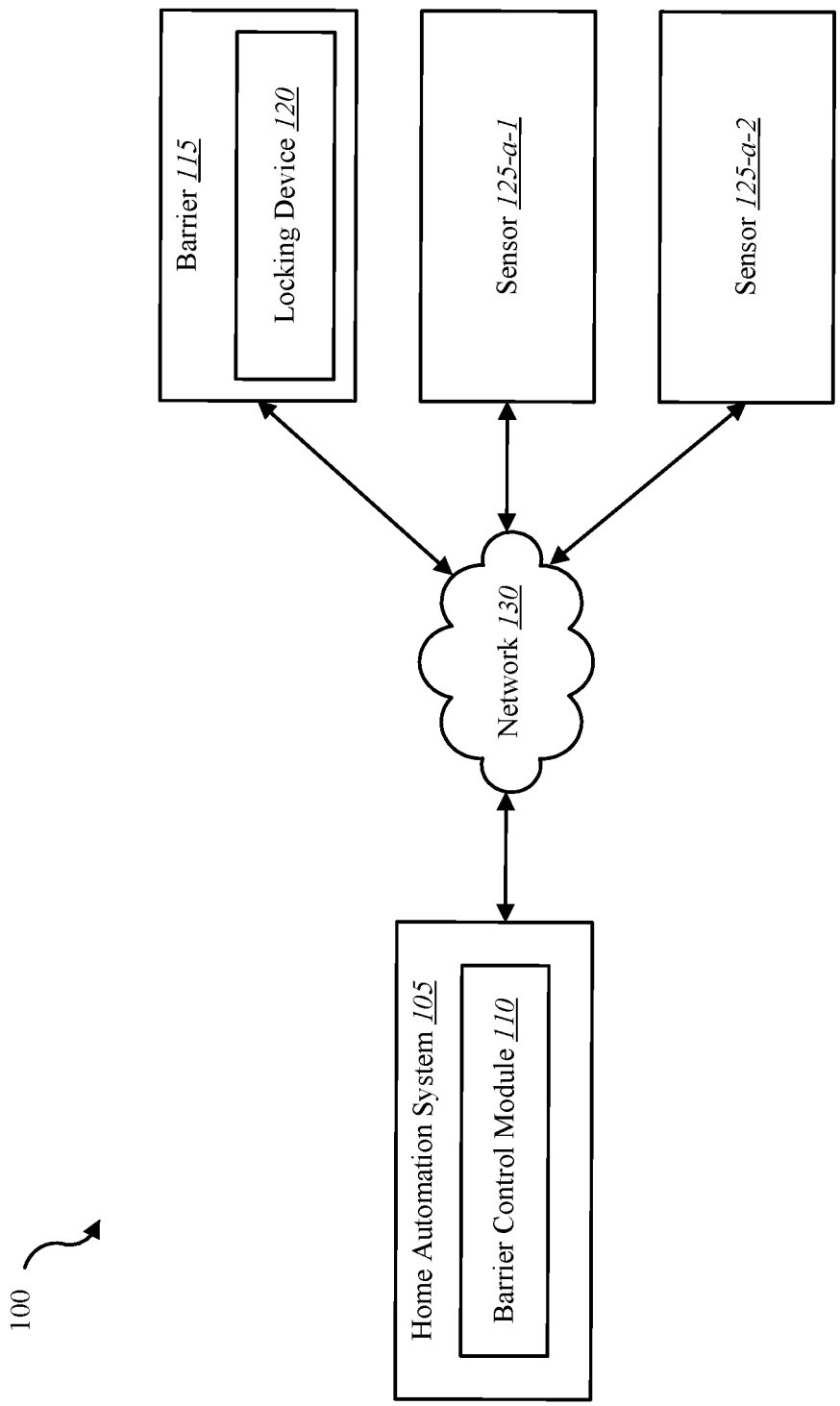
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to controlling access to a home or business based at least in part on user occupancy (e.g., whether the user is inside or outside of the home), user identity, and user activities. The term "home" used throughout this document generically refers to any dwelling or property that is monitored by a monitoring system such as an automation system and/or a security system. An automation system may include automation and security features.

One aspect of the present disclosure relates to a home automation and/or home security system that is always in a "on," "active" or "armed" state. The system determines via a combination of identifiers whom is in the home and activities of those in the home, as well as distinguish between who is trying to gain access to the home, and whether or not to trigger an alarm when barriers to the home (e.g., doors or windows) are actuated. The system includes sufficient sensor feedback and intelligence to determine who is authorized to gain access to one of the home barriers and who is not, and then trigger an alarm only when unauthorized persons gain access to the home. Those who are authorized to enter the home may possess or be identified using, for example, a key code, a near field communication like Bluetooth, a voice recognition or image recognition, or the like (as further described below) that the system is able to utilize as part of determining identity of a person. Moreover, in some examples, those accessing a barrier and/or entering a home may occur automatically, without required action by some user within the home or elsewhere, and/or without a physical key to a door lock. In contrast, those who do not have authorization would trigger firing of the alarm if attempting to gain access to the home.

In one aspect of the present disclosure, those who are not qualified for a certain designation may not gain access to a home. More generally, the present disclosure may relate to ways of providing additional security at a barrier, and preventing unqualified persons or those of a certain or a different designation from access to the barrier, and without endangering occupants or approved persons. For example, a person desiring to gain access to a home will typically ring the doorbell or knock on the door or otherwise request that a designated person (e.g., a person of or having a certain designation) grant access to a barrier, by for example unlocking and opening the door. Before unlocking the door, however, designated person or occupant will normally identify the person outside, at least sufficiently to determine that the person outside the barrier does not present a threat.

Other methods for identifying persons, however, may have several drawbacks, such as for example requiring communication between an occupant and the person seeking to access the barrier. This process may process may pose an unnecessary annoyance and/or an interruption for an occupant when the person seeking to gain access to the barrier is of an approved designation and does not present any remote threat. However, when the person seeking access is not properly designated for accessing the barrier and may pose a threat to safety, such communication may also be potentially dangerous.

For example, when a user communicates remotely with a person seeking to gain access into a home, the communication may enable discovery that the user is not inside the home. Perhaps even more dangerously, when the occupant communicates with the user in person—for example, at a doorway—the occupant may open the door even against his/her better judgment—for example due to deceit, pressure tactics, compulsion, or simply out of a desire to seem polite. In some instances an open door may lead to a potentially dangerous person gaining access to the home. Even where the potentially dangerous person is not granted access to the home, the required communication to identify the person outside the barrier may entail other risks, such as for example, divulging who is inside the home and locations of the person(s) inside.

Thus, one aspect of the present disclosure may include a method of doorway authentication that avoids or is in addition to required communication between a person seeking to access a barrier and another user, which may allow safe access to a barrier automatically, without required actions of an occupant. Relatedly, in one aspect, the authorized operators of the home automation and/or home security system (i.e., a home automation system or a monitoring system) may no longer be required to actively arm or disarm the system (e.g., turn on or turn off) in certain situations. In some examples, one way to determine whether to allow a user to access a barrier of the home may be to distinguish between accessing the barrier from inside the house or from outside the house. In some embodiments disclosed herein, a person or other subject inside a house may not be automatically granted access outside the house without satisfying certain criteria, which may lead to one or more determinations regarding the person's designations.

One way to determine whether accessing a barrier of the home is authorized is to distinguish between accessing the barrier from inside the house or from outside the house. Various sensors, door and window lock features, GPS readings, near field communication signals, electronic devices associated with and/or carried by a person, and the like may be used to determine the user's position relative to the barrier as well as the user's intent to open the barrier. Another aspect of the present disclosure relates to using a multi-step verification process to confirm not only the user's location relative to a barrier of the home, but also the user's intent and the user's identity.

A further aspect of the present disclosure is directed to devices and related systems to track individuals relative to a home or other predetermined location. In one example, a device may include at least a GPS feature and a near field communication feature (e.g., Bluetooth) which provide location for the carrier of the device as well as provide identification information that may provide authorization for the person carrying the device to access the home. The device may also include an accelerometer which may provide feedback related to activity level of the user. This type of device and related system may be particularly useful for tracking children, elderly and handicapped persons, and pets. The device may be integrated into clothing, accessories (e.g., watches, necklaces, bracelets), or a dedicated electronic device such as a fob that may be held in a pocket or carried on a key chain. Aspects of the device may also be integrated into an existing, multi-functional electronic device such as a cell phone, a tablet computer, or the like. The electronic device may also include a speaker that provides audible signals for communication with the user. The device may be referred to as a tracking device. In some embodiments, the tracking device may be a mobile device.

FIG. 1 is a block diagram illustrating one embodiment of an environment 100 in which the present systems and methods may be implemented. In some embodiments, the systems and methods described herein may be performed on a home automation system 105. The home automation system 105 may include automation and/or security features and functionality. The home automation system 105 may be generally referred to as the monitoring system, or certain aspects of home automation system 105 may be referred to as a monitoring system, automation system, and/or security system. The home automation system 105 may be useful for applications in a home. Alternatively, or additionally, home automation system 105 may be applicable to a place of business and/or commercial setting. The same principles disclosed herein related to home automation system 105 and environment 100 generally, may be applied in many settings including homes and commercial buildings (e.g., warehouses, office buildings, etc.).

The environment 100 may include the home automation system 105, a barrier 115, and first and second sensors 125-a-1 and 125-a-2, which communicate over at least one network 130. Home automation system 105 may include a barrier control module 110. Barrier 115 may include a locking device 120. Sensors 125-a-1 and 125-a-2 may be any of a variety of sensors or other data collection devices used to determine occupancy, activity, identification, and/or specific location of one or more persons for purposes of, for example, controlling access to a home and/or determining location of one or more persons relative to a home. The network 130 provides communication via, for example, wired or wireless connections. Further, network 130 may include a plurality of communication mediums.

The sensors 125-a-1 and 125-a-2 may be associated with, for example, an automation system and/or a security system. The sensors 125-a-1 and 125-a-2 may include, for example, a camera sensor, an audio sensors, a forced-entry sensor, a shock sensor, a proximity sensor, a boundary sensor, an appliance sensor, a light fixture sensor, a temperature sensor, a light beam sensor, a three dimensional (3D) sensor, a motion sensor, a smoke sensor, a glass break sensor, a door sensor, a window sensor, a carbon monoxide sensor, an accelerometer, a global positioning system (GPS) sensor, a Wi-Fi positioning system sensor, a capacity sensor, a radio frequency sensor, a near-field communication sensor (Bluetooth), a heartbeat sensor, a breathing sensor, an oxygen sensor, a carbon dioxide sensor, a brainwave sensor, a movement sensor, a voice sensor, and the like.

Figure 4:
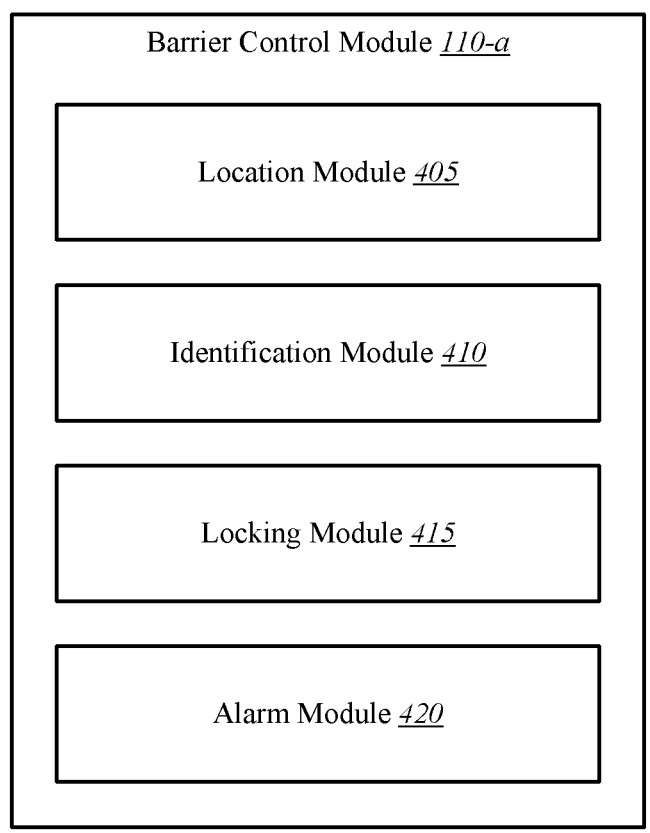
FIG. 4 is a block diagram of an example barrier control module of the environments shown in FIGS. 1 and 2.

In some configurations, home automation system 105 may include additional components such as, for example, those components described below with reference to FIG. 2. Barrier control module 110, which is described in further detail below related to FIG. 4, is operable to provide communications and controls related to accessing barriers such as doors and windows of a building (e.g., home or a commercial building). Barrier control module 110 may include different types of functionality including, for example, receiving data from locking device 120, sensors 125-a-1 and 125-a-2 and other features of environment 100, determining a location of one or more persons relative to the home, determining an intended action of the person (e.g., opening or closing a door or window), and determining whether to permit the intended action and/or trigger an alarm if the action is not authorized or is performed by an unauthorized person. Triggering an alarm may include sending a notice to, for example, police, security personnel, an owner or person responsible for the home, or a person attempting to perform the action (e.g., operate barrier 115).

A locking device 120 may operate to control opening of barrier 115. Locking device 120 may include capability to determine whether barrier 115 is being accessed from inside or outside the home. For example, a locking device 120 may have integrated therein at least one of sensors 125-a-1 and 125-a-2, which utilize a technology such as, for example, touch sensors, electromagnetic sensors, motion sensors, optical sensors, cameras (some of which have facial, voice, body, iris, and retina recognition capabilities) or the like. Data received from locking device 120 and/or sensors 125-a-1 and 125-a-2 may be used to help determine on which side of the barrier the operator is positioned and/or which components of locking device 120 are being actuated (e.g., a handle or switch positioned on and outside or inside of the barrier 115), and whether a person is authorized or unauthorized to access a barrier.

As discussed above, home automation system 105 and/or environment 100 generally may be operable in an always "on" (e.g., active or armed) operational state. Home automation system 105 may be a "smart" system that is able to determine, based on information gathered from a variety of sources such as sensors 125-a-1 and 125-a-2 and other features of environment 100, which individuals located in and around a home are authorized to access the home and/or perform certain functions/activities. By maintaining the home automation system 105 in an always "on" state, authorized users are able to avoid the arduous task of having to arm and disarm the system (whether onsite or remotely) to provide the desired automation and/or security functionality for the home.

In one scenario, home automation system 105 operates to permit anyone who is within the home to exit the home while the home automation system 105 remains in an "on" state without triggering an alarm. The system presumes that any person who is located within the house has been authorized in some way to enter the house, and is therefore authorized to exit the house at any time. Thus, the user's location (e.g., occupancy) within the home may alone be enough to provide authorization for the user to exit the home without triggering an alarm event. Similarly, users positioned within the house may operate windows or other barriers without triggering an alarm as long as the users are within the house. The home automation system 105 may be programmed to automatically operate locking device 120 to unlock barrier 115 as a user approaches barrier 115 and/or attempts to open barrier 115 (e.g., to exit).

Additionally, or alternatively, home automation system 105 may be programmed to permit only certain authorized users to operate barrier 115 when the user is within the home. In some situations, elderly persons, handicapped persons, or small children may be prohibited from exiting the home or operating barrier 115 without express permission of authorized users. In such scenarios, those persons residing within the home may have an identifier that provides home automation system 105 with an identification factor used to determine whether that user is authorized to access barrier 115. In one example, authorized users may be identified using, for example, a cell phone app, near field communication such as Bluetooth, voice recognition, facial recognition, fingerprint recognition, or the like. Once home automation system 105 confirms whether the user is authorized via one of these identification methods, home automation system 105 permits the user to access barrier 115 from within the home (e.g., without triggering an alarm).

A similar principle may apply to provide authentication of users who are positioned outside of the house. Once a user is identified as an authorized user, home automation system 105 may permit the user to access barrier 115 regardless of the location of the user inside or outside the house. As such, home automation system 105 may remain in an armed state while an authorized user operates barrier 115 from inside or outside the house without triggering an alarm.

In at least some scenarios, an additional authentication factor may be required before permitting access to a barrier. For example, home automation system 105 may receive confirmation that the user is an authorized user and require further information that shows the user's intent to access barrier 115. Home automation system 105 may automatically unlock locking device 120 or otherwise permit operation of barrier 115 after both the authentication and intent factors are satisfied. In one example, a user carries a cell phone that has an app that communicates with home automation system 105 to confirm that the user carrying the cell phone is authorized. The user must or may also touch the door handle or other feature of barrier 115 in order to show the user's intent to access barrier 115 before home automation system 105 performs a function such as, for example, unlocking the locking device 120 or otherwise permitting operation of barrier 115 without triggering an alarm. Similarly, home automation system 105 may generate an alarm or prohibit operation of barrier 115 if the user shows his intent to operate barrier 115 and home automation system 105 determines that the user is not authorized to operate barrier 115 (e.g., in the case of a small child, handicapped person, other individuals, etc.).

Locking device 120 may be controlled automatically by home automation system 105 based on criteria such as, for example, whether the user is an authorized user, the location of the user relative to barrier 115 (e.g., on inside or outside of barrier 115), the intent of the user (e.g., operating a lock or handle of barrier 115), time of day, a preprogrammed event or rule, etc. The automated control of locking device 120 may permit users to enter and exit the home without the need of a key or other means of manually operating locking device 120. As such, the system may be referred to as a keyless system and/or a keyless home wherein access is automatically granted based on predetermined criteria.

Authorized users may obtain entry to a home or access to a barrier in a number of ways. For example, authorized users may be given a fob or other electronic device that communicates with home automation system 105 to permit access through a barrier of the house. Moreover, other devices, modules, and methods may also be utilized as disclosed below and contemplated herein for an authorized user to access a barrier of a home. In another example, operation of a barrier by an authorized user, whether from inside or outside the house, to permit entry or exit by an unauthorized person avoids the unauthorized person triggering an alarm.

Figure 2:
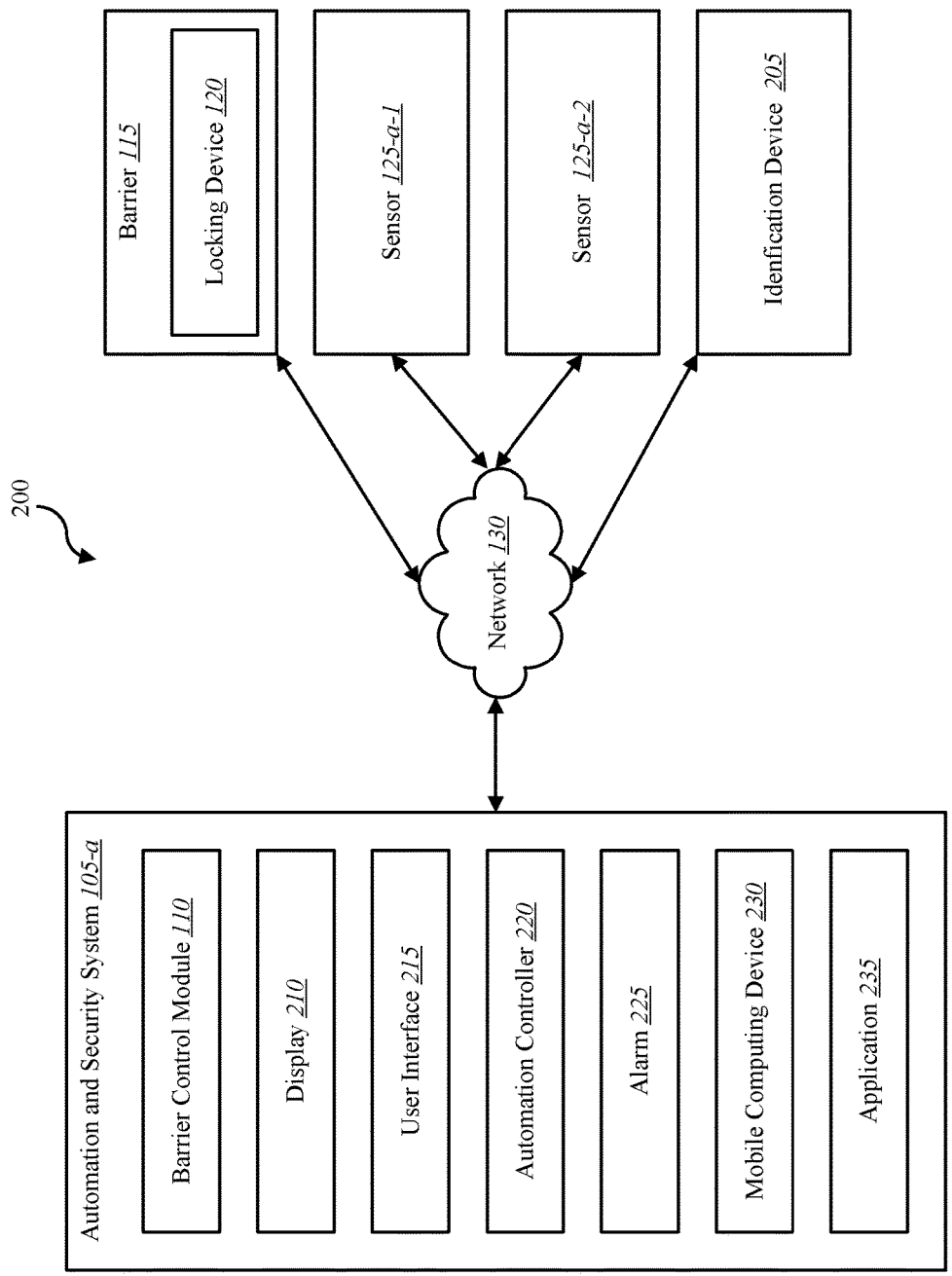
FIG. 2 is a block diagram of another environment in which the present systems and methods may be implemented.

Referring now to FIG. 2, in some embodiments, an environment 200 may include the components of environment 100 described above, and may further include an identification device 205 and a number of additional features associated with home automation system 105-*a*. Home automation system 105-*a* may be an example of home automation system 105 illustrated in FIG. 1. Home automation system 105-*a* may include, for example, the barrier control module 110, a display 210, a user interface 215, an automation controller 220, an alarm 225, a mobile computing device 230, and an application 235.

Environment 200 addresses at least one of the scenarios discussed above with reference to environment 100 in which an authorized user is identified by the home automation system 105-*a*, for example, by carrying an identification device 205 that communicates with home automation system 105-*a*. In one embodiment, when the user is fully authorized (e.g., a highest level of authorization), the user may access barrier 115 from either inside or outside the home without triggering an alarm. If the user is identified by identification device 205 to have a lower level of authorization, the user may have only certain rights such as, for example, operating barrier 115 from the outside to gain access into the home, while not being authorized to access barrier 115 from inside the house to prevent exiting the home. In one example, if a user not carrying identification device 205 is determined to be an unauthorized user, the user may be permitted to exit the home through barrier 115 from the inside (i.e., the system assumes that anyone inside the home was granted access by an authorized user) but may not be able to operate barrier 115 from outside of the home without triggering an alarm.

Identification device 205 may include, for example, a cell phone, fob, or other electronic device that signals sufficient information to determine whether the person carrying identification device 205 is authorized or has a certain level of authorization. In one example, identification device 205 includes near-field communication capability that generates a beacon or other signal that either identifies the person carrying identification device 205 as an authorized person, or provides sufficient information that is unique to that person to determine whether they are authorized or possess some level of authorization for certain actions. Identification device 205 may include, for example, an app carried by a cell phone, tablet or other computing device that provides communication with sensors 125-*a*-1 and 125-*a*-2 or other sensors or features of environment 200. In some embodiments, the mobile device carried by an authorized user may also function as a sensor 125-*a*-1 of the environment. Barrier control module 110 may collect information and/or signals from sensors 125-*a*-1 and 125-*a*-2 and identification device 205 and determine whether to operate locking device 120 or otherwise permit operation of barrier 115 and/or generate an alarm.

Display 210 may be provided via devices such as, for example, a desk top computer, a mobile computing device, or identification device 205. User interface 215 may be integrated into display 210. User interface 215 may include a plurality of menus, screens, microphones, speakers, cameras, and other capabilities that provide an interface with the user of home automation system 105-*a*. User interface 215 may be integrated into mobile computing device 230 or other devices (e.g., one of locking device 120 and/or sensors 125-*a*-1 and 125-*a*-2).

Automation controller 220 may provide features or functionality related to automation and/or security features of home automation system 105-*a*. Automation controller 220 may provide at least some of the logic, processing and/or functionality for various components of home automation system 105-*a*.

Alarm 225 may provide, for example, audible sounds, lights, or the like that communicate with one or more users on the premises being monitored by home automation system 105-*a*, or communicate with a remote device or system related to a condition of the property being monitored by home automation system 105-*a*. Alarm 225 may be integrated into display 210 in the form of, for example, text, coded displays, or the like.

In some embodiments, mobile computing device 230 may include one or more processors, one or more memory devices, and/or a storage device. Examples of mobile computing device 230 may include DVRs, personal video recorders (PVRs), and/or mobile computing devices, smart phones, personal computing devices, computers, servers, etc. Mobile computing device 230 may include, for example, features or functionality of identification device 205, and may, in at least some examples, be interchangeable with identification device 205.

Application 235 may allow a user to control (either directly or via automation controller 220) an aspect of the monitored property, including, for example, security, energy management, locking or unlocking a door (e.g., barrier 115 via locking device 120), checking the status of a door, locating a user or item, controlling lighting, thermostats or cameras, receiving notifications regarding a current status or anomaly associated with a home, office, place of business and the like. In some configurations, application 235 may enable home automation system 105-a to interface with automation controller 220 and utilize user interface 215 to display automation, security and/or energy management content on display 210, user interface 215, mobile computing device 230 or other features of home automation system 105-a. Thus, application 235, via, for example, user interface 215 may allow users to control aspects of their home, office, and/or other type of property. Further, application 235 may be installed on mobile computing device 230 in order to allow the user to interface with a function of home automation system 105-a (e.g., automation controller 220), and to perform other operations as disclosed and contemplated herein.

Sensors 125-a-1 and 125-a-2 shown and described with reference to FIGS. 1 and 2 may represent one or more separate sensors or a combination of two or more sensors in a single device. For example, sensors 125-a-1 and 125-a-2 may represent one or more camera sensors and one or more motion sensors connected to environment 200. Additionally, or alternatively, sensors 125-a-1 and 125-a-2 may represent a combination of sensors such as both a camera sensor and a motion sensor integrated into the same sensor device. Although sensors 125-a-1 and 125-a-2 are depicted as connected to home automation system 105-a separately via network 130, in some embodiments one or more of sensors 125-a-1 and 125-a-2 may be connected directly to home automation system 105-a, barrier 115 (e.g., via locking device 120), or identification device 205.

Additionally, or alternatively, sensors 125-a-1 and 125-a-2 may be integrated into a home appliance or fixture such as a light bulb fixture. Sensors 125-a-1 and 125-a-2 may include a wireless communication device, which enables sensors 125-a-1 and 125-a-2 to send and receive data and/or information to and from one or more devices in environment 200. Additionally, or alternatively, sensors 125-a-1 and 125-a-2 may include a GPS sensor to enable sensors 125-a-1 and 125-a-2 to track the location of a sensor. Sensors 125-a-1 and 125-a-2 may include a proximity sensor to enable the sensor to detect proximity of a user relative to a predetermined distance from a dwelling (e.g., geo fencing). Sensors 125-a-1 and 125-a-2 may include one or more security detection sensors such as, for example, a glass break sensor, a motion detection sensor, or both.

Additionally, or alternatively, sensors 125-a-1 and 125-a-2 may include a smoke detection sensor, a carbon monoxide sensor, or both. In at least one example, sensors 125-a-1 and 125-a-2 may detect the presence of a user within a dwelling being monitored by a home automation system 105-a, a user performing certain functions (e.g., opening or closing a door or window via, for example, a locking device 120), or a user speaking a voice command. Feedback from sensors 125-a-1 and 125-a-2 may function as at least one authentication factor used by barrier control module 110 to determine whether a user is authorized to access one or more barriers 115.

In some embodiments, a user may access the functions of home automation system 105-a (e.g., automation controller 220) from a remote location via, for example, mobile computing device 230. For example, in some embodiments, a mobile computing device 230 may include a mobile application that interfaces with one or more functions of home automation system 105-a (e.g., locking device 120). Locking device 120 and identification device 205 may be one example of, or utilize, mobile computing device 230. Examples of automation controller 220 may include a dedicated home automation computing device (e.g., a wall-mounted controller), a personal computing device (e.g., laptop, desktop, etc.), a mobile computing device (e.g., tablet computing device, smart phone, etc.), and the like.

Figure 3:
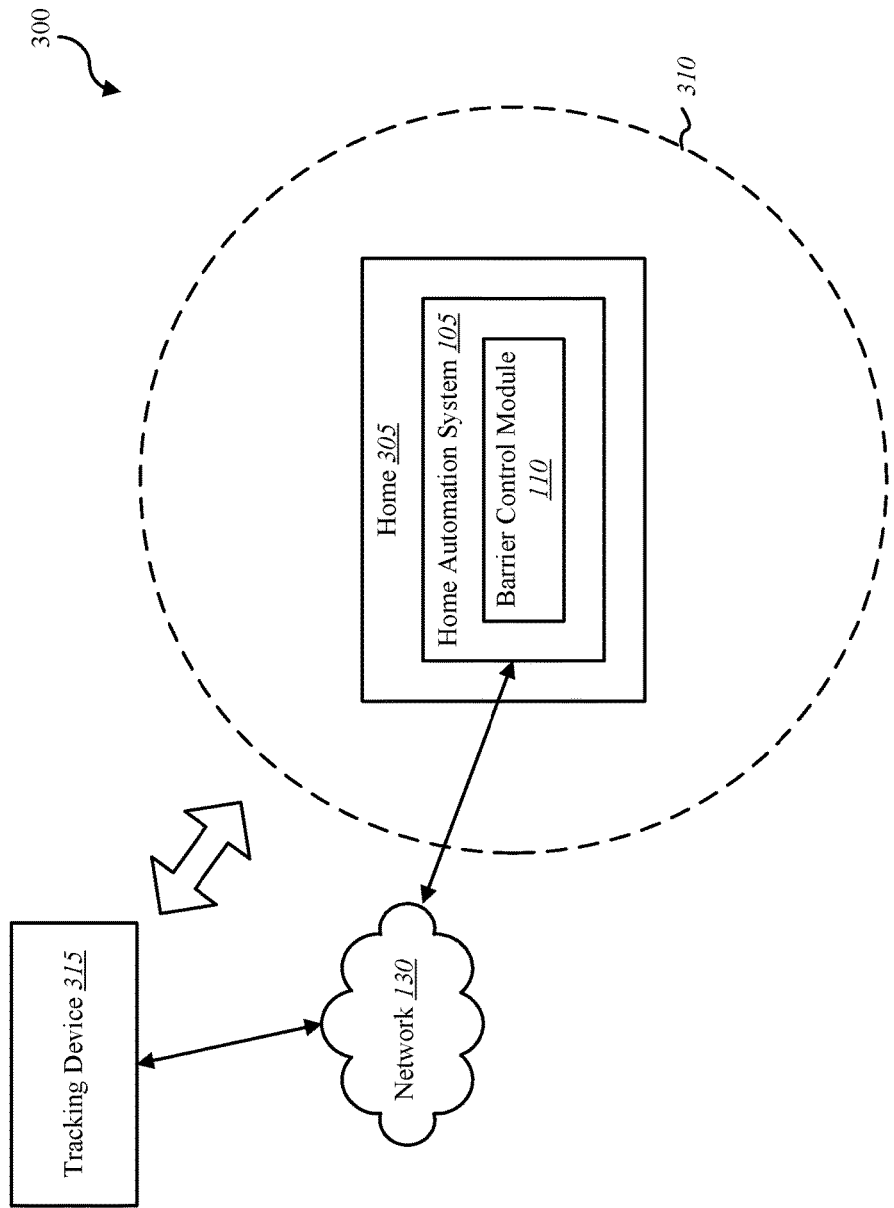
FIG. 3 is a block diagram of another environment in which the present systems and methods may be implemented.

FIG. 3 illustrates another environment 300 that may include at least some of the components of environments 100, 200 described above and may further include a tracking device 315. Home automation system 105 is shown associated with a home 305. Tracking device 315 may be used to track the location of a person, animal, vehicle, or the like relative to a boundary 310 (e.g., geo fence) and home 305. Tracking device 315 may communicate with home automation system 105 via, for example, network 130. Tracking device 315 may at times be positioned within home 305, at other times within boundary 310 and outside of home 305, and at other times outside of boundary 310.

Tracking device 315 may include a plurality of technologies and functionality that help determine not only a location of tracking device, but identification of the device and/or the person or object carrying tracking device 315, and an activity level of the person or object carrying tracking device 315. Further details concerning features and functionality of tracking device 315 are described below with reference to FIG. 5.

Although home 305 may be identified as a building structure being monitored by home automation system 105, home 305 may represent other buildings, properties, or objects being monitored by home automation system 105. Home automation system 105 may include barrier control module 110 as described above with reference to FIGS. 1 and 2. Barrier control module 110 may operate to control operation and/or access through a barrier of home 305. Home 305 may include any of the other features and functionality of environments 100, 200 described above with reference to FIGS. 1 and 2, including, for example, the barrier 115 including the locking device 120, the sensors 125-a-1 and 125-a-2, the identification device 205, and various other features of home automation system 105.

Tracking device 315 may include capability to determine a relative location between tracking device 315 and home 305. In one example, tracking device 315 includes a GPS or similar technology that provides such location determination. Tracking device 315 may include identification technology such as, for example, near-field communication (e.g., Bluetooth) that helps communicate identification information to home automation system 105 and/or barrier control module 110. The identification information may include, for example, information needed to authenticate one or more users and/or authorize certain actions by the person or object carrying tracking device 315. In one example, tracking device 315 includes the same or similar functionality of identification device 205 described above.

Tracking device 315 may also include an accelerometer or other device that helps determine activity of the person or object carrying tracking device 315. For example, tracking device 315 may provide information about movement of the person or object within a given time period. In one scenario, the movement data helps determine whether a person has fallen asleep, has a health problem, is running, etc. This movement information may be helpful in determining, for example, whether to immediately send assistance to the person carrying tracking device 315.

Tracking device 315 may be structured in a variety of forms. For example, tracking device 315 may be in the form of a fob, a cell phone, or other electronic device. Tracking device 315 may be integrated into an existing device that helps conceal tracking device 315. For example, tracking device 315 may be integrated into a piece of clothing (e.g., a seam of a pair of pants, brim of a hat, or a shoe sole), an accessory (e.g., a bracelet, anklet, or necklace), back pack, water bottle, or other portable electronic device (e.g., a tablet, computer, personal game station, or the like).

FIG. 4 is a block diagram 400 illustrating one example of a barrier control module 110-a. Barrier control module 110-a may be one example of barrier control module 110 depicted in FIGS. 1, 2 and/or 3. As depicted, barrier control module 110-a may include a location module 405, an identification module 410, a locking module 415, and an alarm module 420. Barrier control module 110-a may include more or fewer modules and capabilities in other embodiments.

Location module 405 may operate to determine a location of one or more users, occupants, and/or visitors to a property such as a home or commercial place of business. Location module 405 may utilize information provided from a number of sensors, devices or systems to determine the location of a person or object. For example, location module 405 may receive sensor signals from sensors 125-a-1 and 125-a-2 shown in FIGS. 1 and 2. In one example, the information received by location module 405 may relate to operation of locking device 120 of barrier 115 (see FIGS. 1 and 2). The information about locking device 120 and/or barrier 115 may help determine whether the person is positioned on an interior or exterior of barrier 115. Other information may include information from a tracking device such as tracking device 315 described with reference to FIG. 3. The person or object may be determined to reside not only outside of the home, but also outside of a barrier (e.g., boundary 310 such as a geo fence). Location module 405 may also receive information related to a person's direction of travel relative to a barrier of a home (e.g., moving into or out of a home through a barrier).

Identification module 410 may be used to identify one or more persons or objects. Identification module 410 may receive information from any of a plurality of sensors or other devices or systems that provide insight into a person's activities and/or what the person is authorized to do relative to, for example, a barrier or other activity associated with a home automation system. In one example, identification module 410 receives information from identification device 205, which is carried by a person and may provide information specific to that person. The information received by identification module 410 may identify that person as an authorized user, such as a person who is authorized to access a barrier 115 to move into or out of a home.

Locking module 415 may determine whether and/or when to actuate a locking device of a barrier for a monitored home. For example, locking module 415 may provide control of locking device 120 shown in FIGS. 1 and 2. Locking module 415 may have two-way communication with locking device 120 to not only send instructions concerning locking or unlocking, but also receive confirmation concerning the current state or action carried out by locking device 120.

Barrier control module 110-a may include other features and functionality to permit communication with other features of home automation system 105. For example, barrier control module 110-a may determine that a person is attempting to operate a barrier of a home from outside the home based on functionality of location module 405. Barrier control module 110-a may determine that the person is an unauthorized user using identification module 410. Barrier control module 110-a may confirm that a locking device remains locked by functionality of locking module 415. Barrier control module 110-a may send a signal to home automation system 105 to generate an alarm that an unauthorized person is attempting to gain access to the property.

In at least some arrangements, barrier control module 110-a may also include an alarm module 420 that generates an alarm when unauthorized access of barrier occurs.

Figure 5:
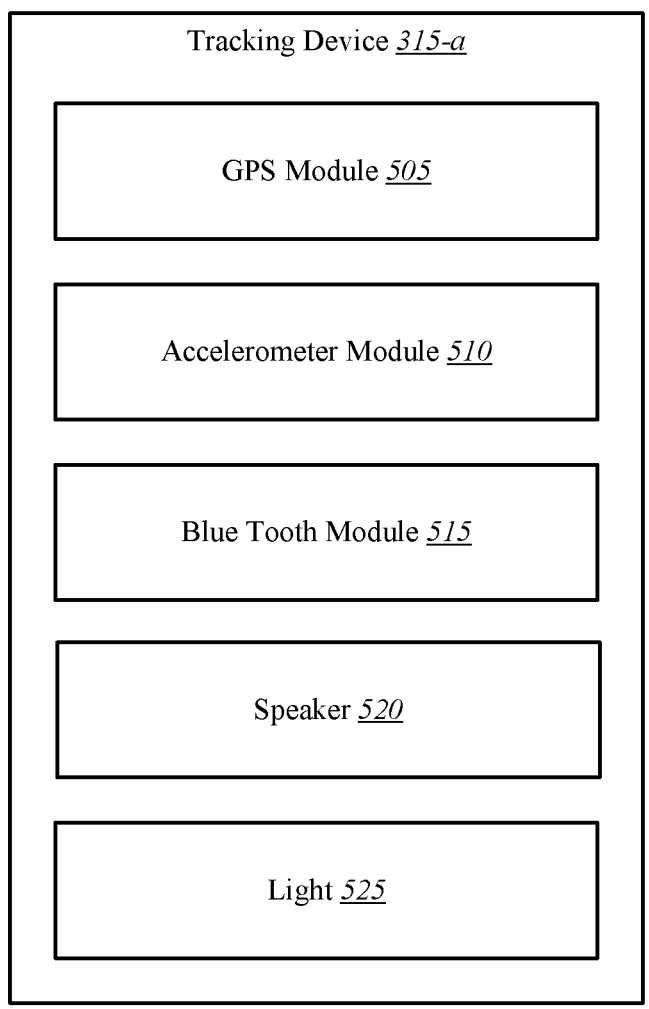
FIG. 5 is a block diagram of an example tracking device of the environment shown in FIG. 3.

FIG. 5 is a block diagram 500 illustrating an example tracking device 315-a. Tracking device 315-a may be one example of tracking device 315 depicted in FIG. 3. Tracking device 315-a, as depicted, may include a GPS module 505, an accelerometer module 510, a Bluetooth module 515, a speaker 520, and a light 525. Tracking device 315-a may include more or fewer modules and capabilities in other embodiments.

GPS module 505 may operate to provide mapping or positioning of tracking device 315-a relative to a reference point such as a property (e.g., home) being monitored by a home automation system 105 as described with reference to FIGS. 1-3. GPS module 505 may operate using various positioning technologies including global positioning systems (GPS), although other types of positioning and/or tracking technologies may be possible.

Accelerometer module 510 may comprise an accelerometer that monitors movement of tracking device 315-a. Accelerometer module 510-a may also infer a particular type of activity being carried out based on the movement data. For example, accelerometer module 510 may determine that a person or object carrying tracking device 315-a is running, walking, sitting/lying, traveling by vehicle, or the like. Accelerometer module 510 may be operable to generate notices or other signals based on a change in activity level or maintaining a certain activity level for a predetermine time period.

Bluetooth module 515 may provide identification information related to tracking device 315-a and/or the person or object carrying tracking device 315-a. Bluetooth module 515 may implement Bluetooth technology or other near-field communication technology. Other types of technology may be used to convey identification information such as RFID technology.

Speaker 520 may provide at least one-way communication between tracking device 315-a and the person or object carrying tracking device 315-a. In one example, speaker 520 generates a beep, chime, audible voice message, music, ringtone, etc., wherein any of the generated sounds conveys a message. For example, speaker 520 may generate a voice message of "Jimmy, come home for dinner" at a certain time of day when GPS module 505 confirms that tracking device 315-a carried by Jimmy is away from home or outside of a geo boundary relative to the home. In another example, speaker 520 may generate an audible tone when accelerometer module 510 identifies no activity by the person carrying tracking device 315-a for a predetermined time period, which may indicate that the person has fallen asleep and needs to be roused. In a further example, speaker 520 may generate an audible series of numbers that represents a code for accessing a barrier of a home after Bluetooth module 515 communicates with a home automation system to confirm that the person carrying tracking device 315-*a* is an authorized user and the code permits access by the user.

Tracking device 315-*a* may include other communication features such as, for example, one or more light-generating devices such as a light 525. Light 525 may provide a visual indication to the person or object carrying tracking device 315-*a*. Light 525 may generate a light pattern, light color, or the like that communicates information to the person carrying tracking device 315-*a*. For example, a flashing red light may indicate that the person has moved outside of a geographical boundary relative to the home. A solid light may indicate a low battery for tracking device 315-*a*. A combination of lights displayed in series may communicate other information such as an indication that the person needs to take a dose of medicine.

Tracking device 315-*a* may include other features and functionality that assist in providing information about the person or object carrying tracking device 315-*a* or communicating directly with the person. In at least some examples, tracking device 315 includes a two-way communication system.

Figure 6:
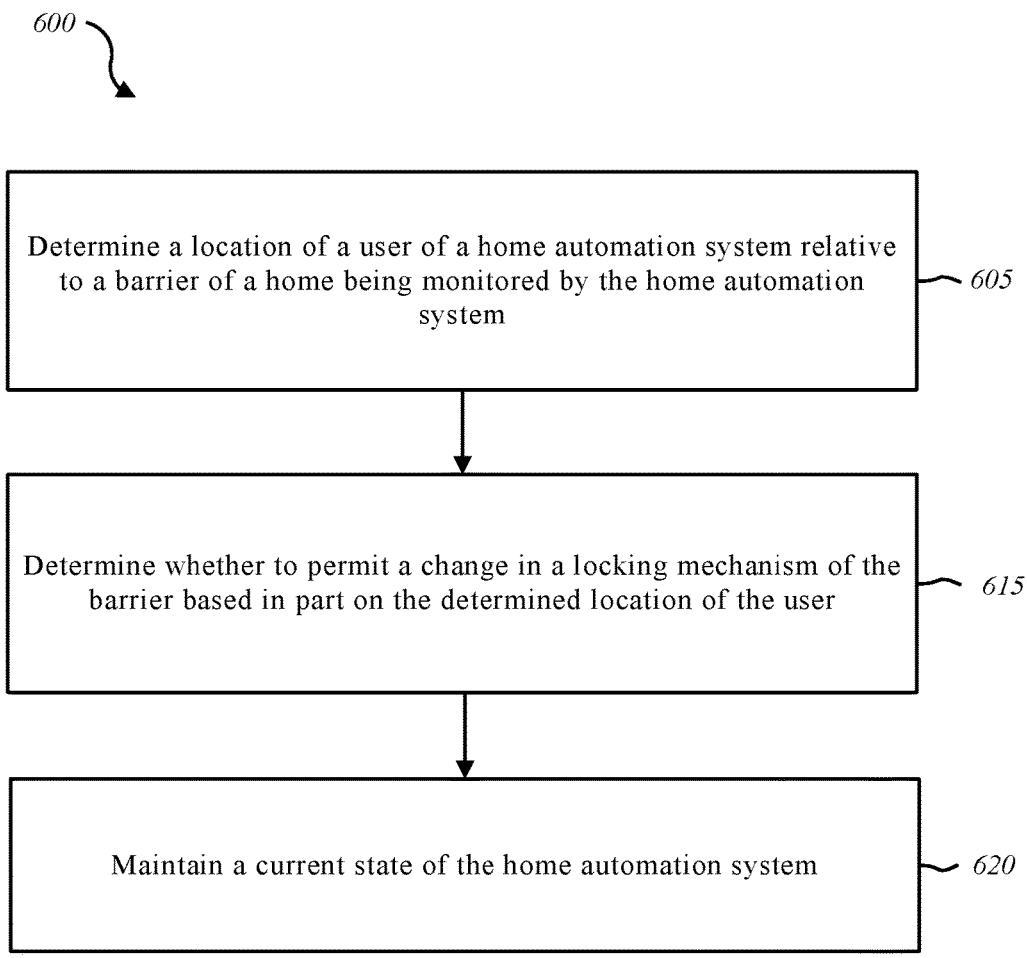
FIG. 6 is a flow diagram illustrating a method for controlling access to a home based on user occupancy.

FIG. 6 is a flow diagram illustrating one example of a method 600 for controlling access to a home based on user occupancy. In some confirmations, the method 600 may be implemented by the barrier control module 110 of home automation system 105 shown in FIGS. 1, 2 and/or 3. In other examples, method 600 may be performed generally by home automation system 105 shown in FIGS. 1, 2, and/or 3, or even more generally by the environments 100, 200, 300 shown in FIGS. 1-3, respectively. In some embodiments, method 600 may be implemented in conjunction with barrier 115 and/or locking device 120 shown in FIGS. 1 and/or 2.

At block 605, method 600 includes determining a location of a user of a home automation system relative to a barrier of a home being monitored by the home automation system. Block 615 includes determining whether to permit a change in a locking mechanism of the barrier based in part on a determine location of a user. Block 620 of method 600 includes maintaining a current state of the home automation system. The current state of the home automation system may be an on or active state such as an armed state of the security system.

Other steps of method 600 may include determining an identify of the user, wherein determining whether to permit the change in the locking mechanism of the barrier is based in part on the identity of the user. Determining a location of a user may include determining whether the user is inside or outside of the home. Determining a location of the user may include determining on which side of a barrier the user is positioned. The barrier may be a door or a window of the home, and the change in the locking mechanism may include locking or unlocking the locking mechanism to control opening of the door or window. Determining the location of the user may include determining whether the user is touching an inside handle used to control opening the barrier, or an outside handle used to control opening of the barrier. Determining whether to permit a change in a locking mechanism of the barrier may include unlocking the locking mechanism if the user is inside the house. Determining whether to permit a change in the locking mechanism of the barrier may include unlocking the locking mechanism if the user is located inside or outside the home and is identified as an authorized person, and maintaining the door locked if the user is located inside or outside the home and is identified as an unauthorized person. The method 600 may include generating an alarm when the user is identified as an unauthorized person and attempts to open the barrier from outside the home. Determining a location of a user may include receiving signals from at least one of a touch sensor, a voice recognition sensor, a motion sensor, and an optical sensor.

Figure 7:
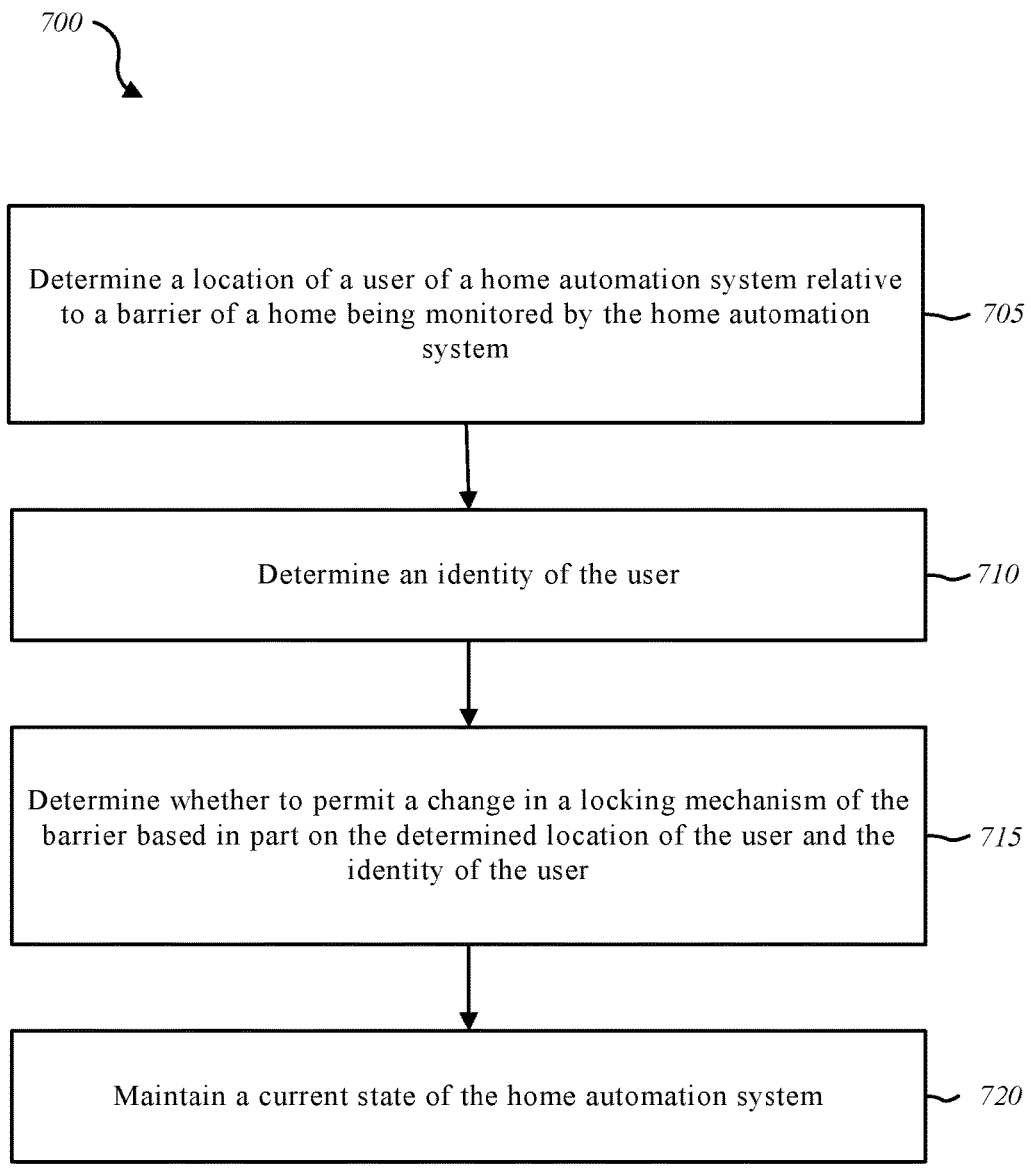
FIG. 7 is a flow diagram illustrating another method for controlling access to a home based on user occupancy.

FIG. 7 is a flow diagram illustrating one embodiment of a method 700 for controlling access to a home based on user occupancy. In some configurations, the method 700 may be implemented by the barrier control module 110 of home automation system 105 shown in FIGS. 1, 2 and/or 3. In some examples, method 700 may be performed generally by home automation system 105 shown in FIGS. 1, 2 and/or 3, or even more generally by environments 100, 200 or 300 shown in FIGS. 1-3, respectively. In some configurations, method 700 may be implemented in conjunction with locking device 120 and/or barrier 115 shown in FIGS. 1, 2 and/or 3.

At block 705, method 700 includes determining a location of a user of a home automation system relative to a barrier of a home being monitored by the home automation system. Block 710 includes determining an identity of the user. Block 715 includes determining whether to permit a change in a locking mechanism of the barrier based in part on the determined location of a user and the identity of the user. Block 720 includes maintaining a current state of the home automation system.

The current state of the home automation system may include an "on" or active state such as an armed state of the security system. The determining step shown in block 715 may also include unlocking the locking mechanism if the user is located inside or outside the home and has been identified as an authorized person, and maintaining the door locked if the user is located outside the home and is identified as an unauthorized person. Determining a location of the user may include determining if the user is touching an inside handle or an outside handle used to open the barrier. Determining the identity of the user may include receiving a signal from an electronic device carried by the user.

Figure 8:
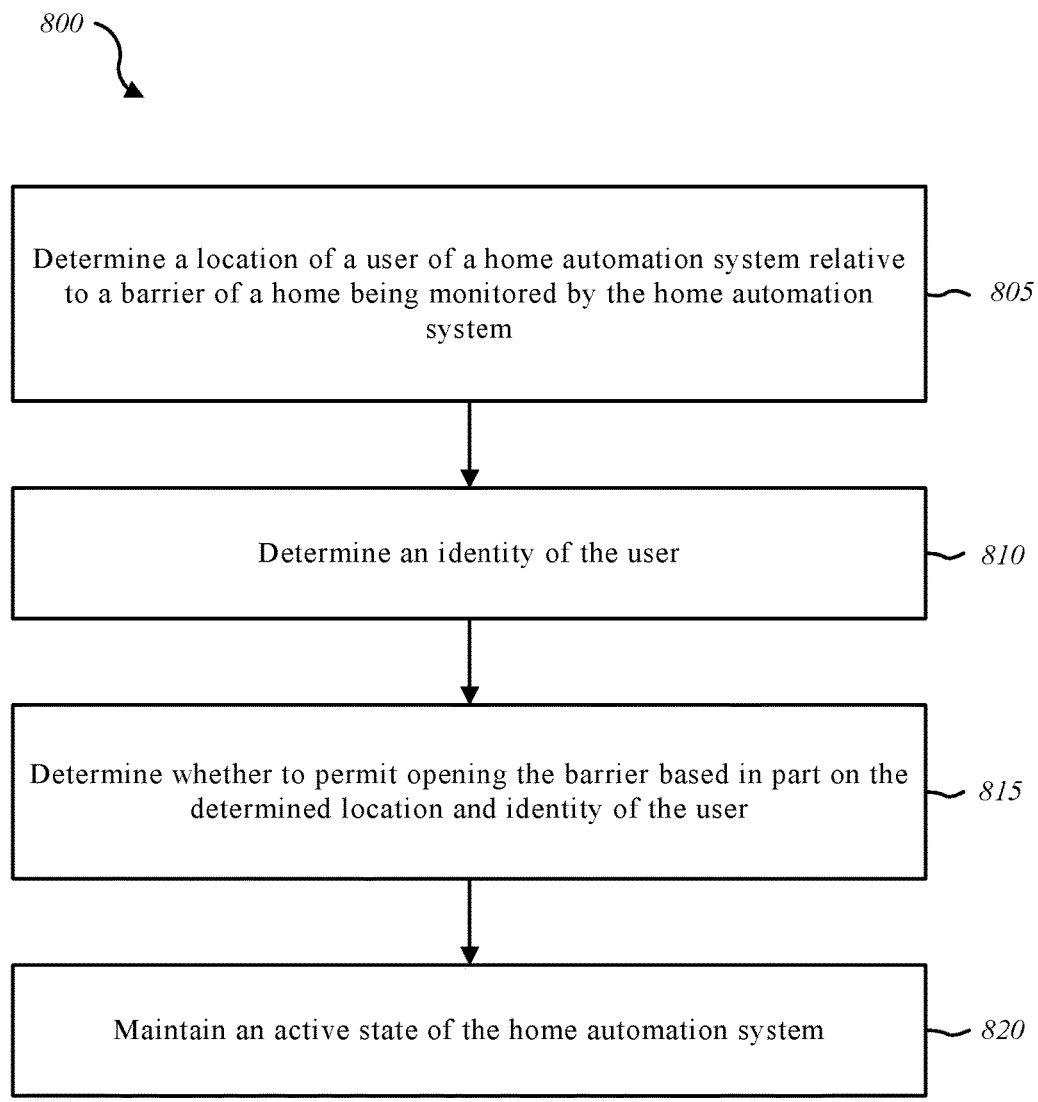
FIG. 8 is a flow diagram illustrating another method for controlling access to a home based on user occupancy.

FIG. 8 is a flow diagram illustrating one example of a method 800 for controlling access to a home based on user occupancy. In some configurations, the method 800 may be implemented by the barrier control module 110 of home automation system 105, shown in FIGS. 1, 2 and/or 3. In other examples, method 800 may be performed generally by home automation system 105 shown in FIGS. 1, 2 and/or 3, or even more generally by the environments 100, 200 or 300 shown in FIGS. 1-3, respectively. In some configurations, method 800 may be implemented in conjunction with locking device 120 and/or barrier 115 shown in FIGS. 1 and/or 2.

At block 805, the method 800 may include determining a location of a user of a home automation system relative to a barrier of a home being monitored by the home automation system. Block 810 includes determining an identity of the user. Block 815 includes determining whether to permit opening the barrier based in part on the determined location and identity of a user. Block 820 includes maintaining an active state of the home automation system. The active state may be maintained for all steps of method 800.

Method 800 may also include unlocking a locking mechanism of the barrier when a user is identified as an authorized user, and locking the locking mechanism when the user is identified as an unauthorized user. The method 800 may include unlocking a locking mechanism of the barrier when a user is determined to be located on one side of the barrier, and locking the locking mechanism when the user is determined to be located on an opposite side of the barrier. Determining a location of the user may include determining use of a handle assembly used to open the barrier.

Figure 9:
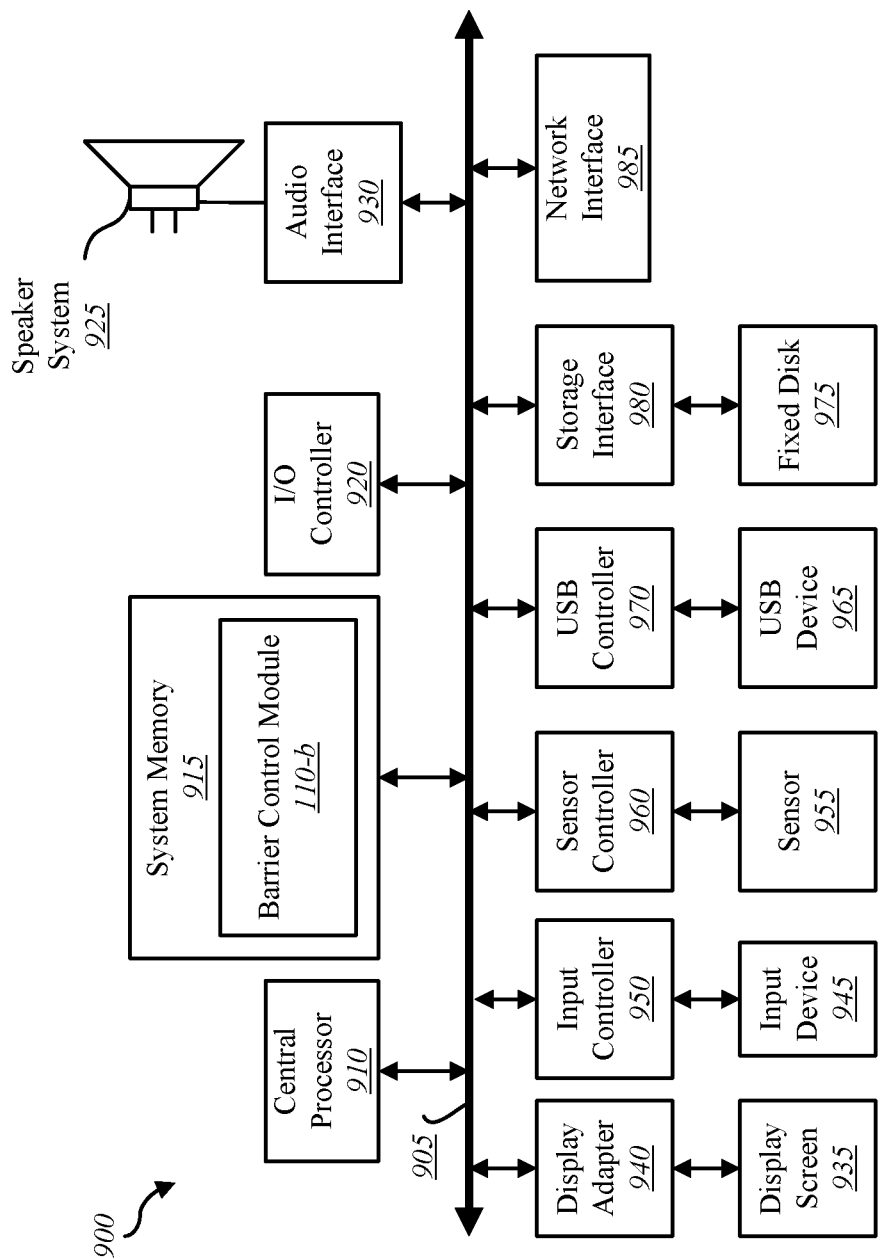
FIG. 9 is a block diagram of a computer system suitable for implementing the present systems and methods of FIGS. 1-8.

FIG. 9 depicts a block diagram of a controller 900 suitable for implementing the present systems and methods. The controller 900 may be an example of the automation controller 220 and/or the mobile computing device 230 illustrated in FIG. 3. In one configuration, controller 900 includes a bus 905 which interconnects major subsystems of controller 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a barrier control module 110-b to implement the present systems and methods may be stored within the system memory 915. The barrier control module 110-b may be an example of the barrier control module 110 illustrated in FIGS. 1, 2 and/or 3. Applications (e.g., application 330) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present systems and methods. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of system memory 915 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
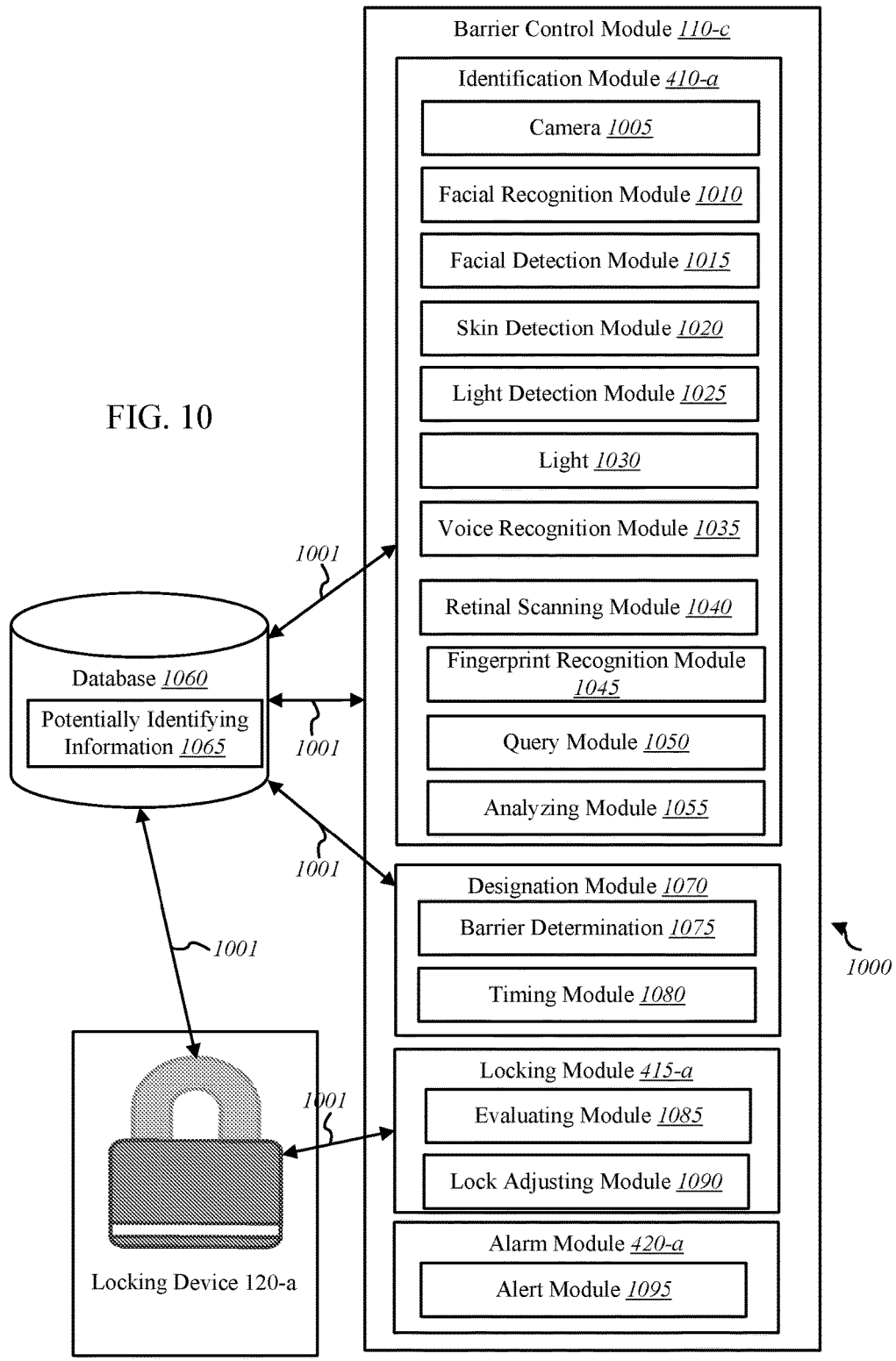
FIG. 10 is a block diagram of an example barrier control module for security and/or automation systems.

FIG. 10 is a block diagram 1000 illustrating one barrier control module 110-c embodiment. As depicted, barrier control module 110-c may include an identification module 410-a, a designation module 1070, and a locking module 415-a, among others. Barrier control module 110-c, identification module 410-a, and locking module 415-a may be similar in one or more aspects to barrier control module 110, 110-a, identification module 410, and locking module 415, depicted in FIGS. 1-4, among others. The aforementioned modules and/or devices may communicate using for example, wired or wireless connections 1001, and/or other communication methods or techniques.

Identification module 410-a may be used to identify one or more users and/or objects, and may include and/or involve various sensors, electronic devices, and/or modules. Identification module 410-a may receive information from any of a plurality of sensors or other devices or systems that provide data, calculations, and/or determinations regarding the identity of a user. In one example, identification module 410-a is not required to include the identification device 205 depicted in FIG. 2. In some embodiments, identification module 410-a may include a camera 1005 capable of capturing identification information relevant to identifying the user.

In some examples, the camera 1005 may capture visible features and/or characteristics of a user. In one example, camera 1005 may capture geometric properties or features of a user's face (e.g., distances between eyes, ears, nose, mouth, widths of eyes, nose, mouth, etc.). Relatedly, the identification module 410-a may include a facial recognition module 1010, which in some embodiments may include the aforementioned camera 1005. In a further example, identification module 410-a may include a facial detection module 1015, which may detect the position and orientation of a user's face (for purposes of facial recognition) within a camera's 1005 field of view. In some examples, as explained below in greater detail, the facial recognition module 1010 may relate to the facial detection module 1015.

Similar in some aspects to the facial detection module 1015 assisting in detecting a user's face, in some examples the camera 1005 may detect where within the camera's 1005 field of view are a user's particular body features, and may capture information related to one or more body features. In some embodiments, the camera 1005 may capture information related to other potentially changeable features of the user, such as for example, hair color, hair style, hair length, facial hair, eye glasses, eye color, hat, article of clothing, or a combination thereof.

In some embodiments, the identification module 410-*a* may also include a light detection module 1025 capable of detecting a light level (for example a light level with respect to a user or a particular feature of a user,) as well as a light 1030 for illuminating the user and/or feature (e.g., a facial feature). Thus, in one example, the light detection module 1025 and light 130 may allow the camera 1005 to have sufficient light for particular operations related to identity determination.

In one example (and as explained in more detail below), the identification module 410-*a* may include multiple cameras 1005, positioned for capturing different viewpoints of a user. In some examples, the identification module 410-*a* may determine the identity of more than one user—for example where one user accompanies a second user.

The identification module 410-*a* may also include other modules related to identifying one or more users. For example, in one embodiment, the identification module 410-*a* may include a skin detection module 1020 for capturing information, for example, regarding a patch of skin of a user, including potentially identifying texture of the skin (color, coarseness, lines, pores, etc.). In the same or alternative embodiment, the identification module 410-*a* may include a voice recognition module 1035 for recognizing, for example, the speech of a user. In the same or alternative embodiment, the identification module 410-*a* may include a retinal scanning module 1040 for capturing information related to a user's eye, including eye-related characteristics such as patterns of a user's retina blood vessels. In some embodiments, the identification module 410-*a* may include an iris scanning module for capturing potentially identifying information related to the patterns of a user's iris or irises. In the same or alternative embodiment, the identification module 410-*a* may include a fingerprint recognition module 1045 for capturing data relating to fingerprint patterns (e.g., fingerprint ridges and minutia) of a user. Some identification module 410-*a* embodiments may include one or any combination of the aforementioned modules. In addition, in some embodiments, one or more of the aforementioned modules may involve or include a mobile computing device (such as mobile computing device 230 of FIG. 2). In one embodiment, a mobile computing device may utilize an app that uses the camera, microphone, fingerprint sensor and/or other sensor of the mobile computing device, to capture identifying information of a user.

In some examples, the identification module 410-*a* may communicate with a database 1060. The database 1060 may include potentially identifying information 1065. The potentially identifying information 1065 may include, for example, information identifying a mobile device of a particular user, information relating to facial and/or body features of specific users, skin texture, retinal data, fingerprints, voice, etc.

With regard to information relating to facial features of specific users, in some examples the potentially identifying information 1065 may include facial features of users from different perspectives, as well as facial features of users wearing different expressions (smile, neutral, etc.). The database 1060 may include potentially identifying information 1065 regarding a plurality of user profiles.

The potentially identifying information 1065 in the database 1060 may be acquired in a number of ways. For example, during an installation/setup phase (and at any point thereafter), the camera 1005 may take pictures of certain features of users, and/or users may otherwise input their potentially identifying information 1065 (using for example a computing device such as mobile computing device 230, and/or a user interface 215), and various modules (e.g., the facial recognition module 1010, skin detection module 1020) may also assist in obtaining potentially identifying information 1065. Alternatively, potentially identifying information 1065 may be downloaded (from a remote source using, for example, a server) and stored locally into a database 1060, or the database 1060 may be located at a remote location (and communicated with, for example, using a server). In another example, new profiles of users may be created as information is captured regarding the new users.

The amount of potentially identifying information 1065 and number of user profiles may vary according to various embodiments and requirements. For example, in some embodiments, the user profiles in a database 1060 may include the residents and occupants of a home. In other embodiments, the user profiles may include trusted neighbors, close family members, friends, etc. In another embodiment, where the barrier is of a school, the user profiles may include the students and teachers and other employees of the school. In a related embodiment, where the barrier is of a business, the user profiles may be of the employees and/or service providers of the business (e.g., delivery personnel). In other embodiments, the database 1060 may include the members of a neighborhood, law officers, postal service employees, and home service providers such as cleaning persons, lawn care providers, the meter man, etc. In some embodiments, the database 1060 may include profiles of criminals, most-wanted persons, and/or persons identifiable in a publicly available sex offender registry. In some embodiments, the user profiles may include potentially identifying information 1065 of pets. In some embodiments, the database 1060 may also include information relating to barriers, such as the number of barriers and where each barrier is located and what points of access there are along the barriers.

The identification module 410-*a* may in one embodiment include a query module 1050. In one example, the query module 1050 may compare captured information with the potentially identifying information 1065 in the database 1060. For example, the query module 1050 may compare one of more features and/or characteristics of a user from the captured information with the potentially identifying information 1065, and determine whether there are matching features and/or characteristics. For example, the query module 1050 may query the database whether there is any user profile with facial features separated by a particular distance, note whether there are any matches, and then (or simultaneously) query the database regarding whether there is any user profile matching another feature of the captured information, and then again note any matches. By way of further illustration, the query module 1050 may form and send queries whether, among other things: the voice of a person at and/or near a barrier matches an identified-voice of a profile in the database 1060, the body of a person (e.g., height) at and/or near a barrier matches the known body data of a profile in the database 1060, a mobile device identifier (and/or key code indicated by a mobile device) at and/or near a barrier matches the mobile device identified of a profile in the database 1060, etc.

In one embodiment, the identification module 410-*a* may include an analyzing module 1055, which may perform a variety of functions relating to the captured data and/or the potentially identifying information 1065, such as processing captured information and potentially transforming it into information more helpful in identifying a user. For example, in one embodiment the analyzing module 1055 may allow estimating a user's height, weight, etc., based on pictures from the camera 1005 and different views thereof. In addition, the analyzing module 1055 may perform a variety of functions relating to the matches (or lack thereof) determined by the query module 1050. For example, the analyzing module 1055 may determine whether the matching (or correctly answered) queries enable identification of a particular user, within a threshold level of certainty. This determination by the analyzing module 1055 may include considering the number of profiles in the database and give weight to certain matching queries more than others. For example, in one embodiment, the analyzing module 1055 may give less weight to, or catalog and/or characterize changeable features (e.g. hair color) differently as compared to other features (eye color and/or patterns, height, fingerprint, distances between facial features, etc.) that are less likely to change, constant, or that are unchangeable. In addition, the analyzing module 1055 may consider that certain body features are changeable (e.g., weight, height, hair length) at a first time and/or over time from the first time when a first image and/or information may have been recorded, and accord less weight to or catalog and/or characterize such changeable features differently than other features.

In one example, the analyzing module 1055 may give less weight to certain captured features and/or characteristics based on the possibility and likelihood of imitation. For example, a matching query based on a two-dimensional facial recognition analysis (which might be imitated by or based on a captured two-dimensional still or video image using a photograph) may be given less weight than a matching query relating to three-dimensional facial recognition analysis. Even in the case of a matching query related to three-dimensional facial recognition analysis, the analyzing module 1055 in one example may consider other features (e.g., height, calculated weight, voice recognition, mobile identifier, etc.) in determining whether the threshold has been satisfied. A threshold may be calculated and satisfied in various ways. In one example, for instance, each matching query may be given a numerical score, and when the scores exceed a numerical level or value, the threshold may be satisfied. In one example, each non-matching query may also be given a negative score. In a further example, when the negative scores and/or the positive scores have a first value less than a certain threshold value, a person and/or subject may be identified with certainty as not matching a particular profile. In some examples, there may be multiple thresholds based on different categories of identification (facial features, body features, retinal scanning, voice recognition, etc.). In another example, queries regarding all features and characteristics are considered together when determining whether a threshold is satisfied.

In one example, the analyzing module 1055 may also give more or less weight to certain matching queries, based on information in the database 1060. For example, where information in a database 1060 indicates that a user has an identical twin or other family members, the analyzing module 1055 may give less weight to matching queries relating to facial recognition, height, hair color, etc., and more weight to matching queries relating to skin texture analysis, fingerprint recognition, mobile device identifies, etc.

The analyzing module 1055 may also consider the number of user profiles in a given database in making determinations. Take for instance a scenario where there are a limited number of user profiles (e.g., four corresponding to the residents of a home), only one of which is associated with a user having blonde hair. Notwithstanding that a matching query relating to hair color may identify only one of a plurality of user profiles—corresponding to the only user with blonde hair—the requisite threshold for identification may not be satisfied. In other words, in some examples, the analyzing module 1055 may not perform functions in a vacuum of limited information included within a database and/or user profiles. Rather, in some embodiments, analyzing module 1055 may consider whether un-profiled persons exist that may also satisfy the query, and guard against generating any false positive based on misidentifying an un-profiled person as a profiled person based on limited data, calculations, and/or determinations.

For example, analyzing module 1055 may receive one image or other information, determine what type of image or other information can be evaluated, attempt to perform one or more operations (including, but not limited to, identifying the person based on the image or other information), may determine other identifying information from the image or other information, and then reevaluate the operation, such as the identification. Additionally, or alternatively, analyzing module 1055 may request and/or receive additional information or data from another source (e.g., image, database) to help determine whether a person should be identified as matching a user profile.

Once a user has been identified with a threshold degree of certainty using, for example, the identification module 410-*a*, the designation module 1070 may assist in determining and/or assigning a designation of the user based, at least in part on the user's determined identity—and, in some examples, determine a designation of a second user based at least in part on the determined identity of the second user. For example, in some embodiments, the designation may indicate whether a user is properly designated to access a barrier. In some examples, a designation may be "parent occupant," "child occupant," "relative non-occupant," "friend non-occupant," "neighbor non-occupant," "service person non-occupant," "temporary visitor non-occupant," "temporary visitor occupant" (who may be staying in the home for a period of time), "serviceperson," "unknown," "intruder," etc. In some embodiments, a particular designation may indicate that a first user can access a barrier with another unidentified user, and/or with a second identified user.

Thus, in some examples, a second user may not be allowed to gain access through a barrier simply by being accompanied with a first user who may access the barrier—e.g., a child and a child's classmate who a parent does not want entering the home based on one or more conditions (such as the parent not being at home). In such a scenario, in a further example, a notification may be provided to the child that he/she may come in but the "friend" must return to his/her own home. Such a message may be prerecorded by a parent and/or may be a system-based notification (and may use in one embodiment the alert module 1095 described in more detail below). In a further embodiment, a door may not unlock until one or more elements of the system (using one or more images, information, or other data) detects certain conditions (e.g., the second user/friend is a certain distance away from the barrier).

In some examples, a designation may correspond to certain levels (such as for example, levels 1-10), permitting a user to access one or more particular barriers (e.g., gate, mailbox, front door, internal door, bathroom door, garage door, shed door). By way of example, the designated level of a particular user may grant the user access to a gate of a property but not enter the home structure, or a particular user may be allowed to access a back door of a property but not enter the front door to the structure. In one example, a particular pet dog user may be able to access a doggie door barrier but not a property gate. In another example, a larger pet may be not allowed to access a doggie door barrier (due for example to size or shedding concerns), but a smaller pet may be allowed to access the barrier. In another example, a designation "child" may also allow access to particular barriers but not others—such as a home office, or a tool shed, a particular closet, or a refrigerator.

In some embodiments, designations and/or levels may also correspond to whether or not a user may access particular barriers and certain specified times. In some examples, a particular user may not be able to enter a gate to access a property during an evening hour (e.g., lawn care professionals and/or other property service providers that should only be present and recognized during certain hours in a day). In one example, a mailperson may have a designation to access a mailbox barrier between certain hours of the day only, but neither the mailperson nor certain other users with particular designations may be able to access the mailbox barrier after dark or at a different time, in order to deter mail theft. In some embodiments, the designation module 1070 may also assist in determining whether a user can access both sides of a barrier, or only pass through the barrier one way.

For example, as mentioned above, a young toddler and/or an elderly person with dementia may access a barrier to enter a home but not leave without another person's approval, input, and/or confirmation at the home and/or another location. Similarly a particular teenage child may not access a barrier to leave the home after a particular time of night and/or doing so may trigger one or more alarms and/or notifications. The designation module may also determine whether or not a user has a designation that merits sending out a type of alert to that user, or because that user (e.g., a user with a criminal designation, or a child arriving home from school) has accessed or tried to access a barrier.

Similar to locking module 415 of FIG. 4, locking module 415-*a* may determine whether and/or when to actuate a locking device of a barrier. For example, locking module 415-*a* may also provide control of a locking device 120-*a* (which may be similar in some aspects to locking device 120 shown in FIGS. 1 and 2). Locking module 415-*a* may also have two-way communication with locking device 120-*a*. Locking module 415-*a* may receive information and/or confirmation concerning the current state or action carried out by locking device 120-*a*. For example, locking module 415-*a* may receive confirmation regarding a current lock position and evaluate the current lock position using an evaluating module 1085.

For example, if the designation of a user indicates that the user has one or more designations relating to the barrier, then the evaluating module 1085 may evaluate whether the locking device 120 is in an unlocked position. On the other hand, where the locking device 120 is in a locked position, and the designation of the use indicates that the barrier is not accessible, the evaluating module 1085 may send instructions to maintain the current locked state of the locking device (or, in some embodiments, simply not send any instructions at all).

Based on the evaluation, the locking module 415-*a*, though, for example, a lock adjusting module 1090, may send instructions concerning locking or unlocking. For example, locking module 415-*a* may send instruction to locking device 120-*a* to initiate a change of the locking device 120-*a*—such as adjusting a lock of the locking device—based at least in part on the determined designation of a user. For example, where the locking device 120-*a* has a currently locked position, but the designation of the user indicates that the barrier is accessible, the lock adjusting module 1090 may send instructions for the locking device 120-*a* to adjust to an unlocked position. Alternatively, in one example where a locking device includes more than one lock, where a first lock of a locking device 120-*a* is in a locked position, but the user's designation indicates that the barrier is not accessible, the locking module 415-*a* may send instructions to adjust the locking device to obtain an additional level of security—for example, to lock at least a second lock (e.g., a deadbolt lock) and/or to require a user-inputted code or voice authorization to additionally verify the user's identity and provide an added level of security.

In some examples, if the evaluating module 1085 determines that the locking device 120-*a* is in an unlocked state, and the designation of the user indicates lack of authority to access the barrier, the lock adjusting module 1090 may cause the locking device 120-*a* to adjust to a locked state. In some embodiments, the identification module 410-*a*, the designation module 1070, and the locking module 415-*a* (including, for example, an evaluating module 1085 and lock adjusting module 1090 thereof), may perform at least some of their respective functions prior to a user reaching a barrier and/or the locking device 120 thereof. In some embodiments, accomplishing operations within such a potentially short timeframe may be facilitated by a camera 1005 of the identification module 410-*a* being positioned well in advance of the barrier and/or by fast processing times in order to identify and designate a user before the user is a predetermined distance away from one or more barriers or is at a predetermined location relating to one or more barriers (e.g., doors, windows).

As mentioned above, locking module 415-*a* may receive confirmation concerning the action carried out by locking device 120-*a*—through, for example, the evaluating module 1085. For example, in some embodiments, the evaluating module 1085 may confirm that a locking device 120-*a* remains locked or was properly locked as instructed, and/or whether a locking device 120-*a* becomes locked again after a user accesses a barrier.

In some examples, the lock adjusting module 1090 and potentially an alarm module 420-*a* (which alarm module 420-*a* may be similar in some aspects to the alarm module 420 of FIG. 4) may account for, and perform operations related to certain errors in the system. For example, where the lock adjusting module 1090 instructs that the locking device 120-*a* be locked, yet the locking device 120-*a* does not or cannot lock, or where the evaluating module 1085 detects an open door that does not or cannot shut, notwithstanding that the designation of an approaching user indicates that the barrier is inaccessible, an alarm module 420-*a* may generate an alarm. Relatedly, in some embodiments, and through, for example, an alert module 1095 of the alarm module 420-*a*, an alert message may be sent notifying of the user approaching the barrier, of any user attempts to gain access to the barrier, and/or if access of the barrier occurs. Such an alert message may be sent, for example, to one or more designated users (such as for example a predetermined parent user) and/or locations (via a speaker or visual alarm), a security monitoring on-call representative, and/or a member of law enforcement.

More broadly, alert module 1095 may send an alert upon any number of conditions or events, which may be in some examples customized by designated users. For example, in one embodiment, a text message may be sent to a mobile device advising a parent that children have arrived from school and entered the home, and whether they are accompanied by any other users. In another embodiment, a text message may be sent to a parent informing that a child has tried to access a barrier with a second user whose designation does not permit entry into the home, which message may include the identification information of the second user. For example, where a user is not identified within a threshold level of certainty, the alert module 1095 may notify a designated user (e.g., parent) of the unidentified user, including a text description of the unidentified user (e.g., approximate height, hair color, clothing, etc.), and/or may send a picture of the unidentified user to the mobile device of one or more designated users. Nevertheless, barrier control module 110-*c* may allow the performance of some operations automatically, and without any actions required of users.

Like barrier control module 110-*a* of FIG. 4, barrier control module 110-*c* embodiment may include more or fewer modules than those depicted, and in some embodiments the operations of modules may overlap to some degree. For example as noted by FIG. 10, barrier control module 110-*c* may not necessarily include a specific location module (e.g., 405 of FIG. 4), and/or, alternatively, the identification module 410-*a* in some aspects may be considered to include a location module. For instance, where an identification module 410-*a* for identifying a user may be located at a particular point on one side of a barrier, the location of the user may be ascertained regardless of whether the user is carrying a designated location device (related to location module 405 as described with respect to FIG. 4) and/or may be based on operations relating to designated location-related devices and/or related data, analysis, determinations, and/or other information. Even where a separate location module may not be present, the identification module 410-*a* may in some examples include detecting a potentially-identifying portable device associated with a user, as discussed above. In addition, barrier control module 110-*c* may also include other features and functionality to permit communication with other features of home automation system 105.

Figure 11:
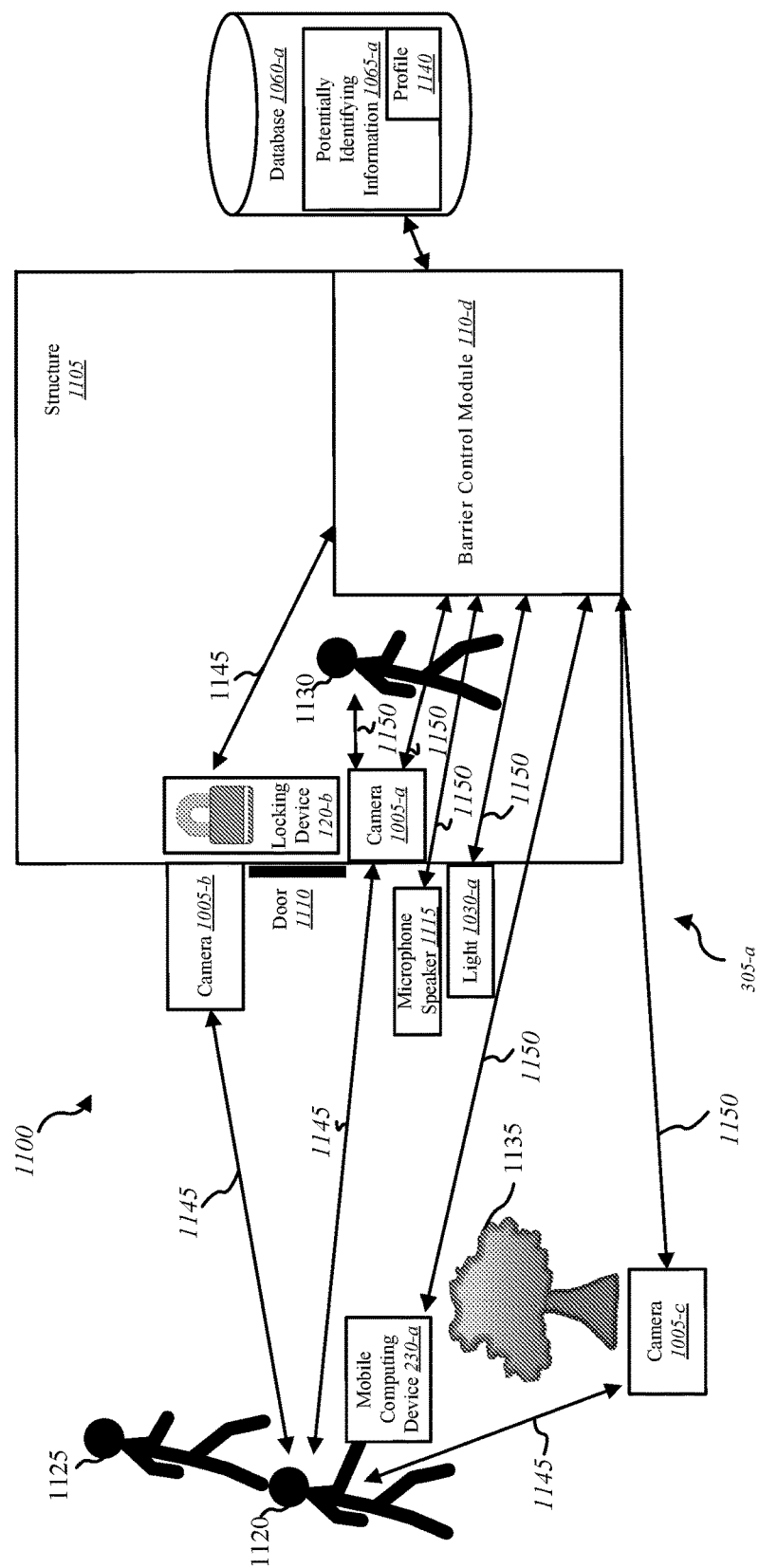
FIG. 11 is a block diagram of an environment in which a barrier control module embodiment and system and method embodiments for security and/or automation systems may be implemented.

FIG. 11 is a block diagram of an environment of a home 305-*a* (which may be similar in one of more aspect to home 305 of FIG. 3) in which a barrier control module 110-*d* embodiment and system 1100 and method embodiments for security and/or automation systems may be implemented. The system 1100 embodiment may include a barrier control module 110-*d* embodiment, which may include utilizing an identification module, a designation module, a locking module, and a database 1060-*a* that may be local or remote. The barrier control module 110-*d* embodiment may also include (and in some examples, as in the embodiment shown, the identification module 410-*a* thereof may include) various modules related to identifying a first user 1120, such as for example a voice recognition module 1035-*a*, facial recognition module 1010-*a*, facial detection module 1015-*a*, etc.

The barrier control module 110-*d* (and for example an identification module thereof) may be in one way or two way communication with various electronic devices and/or sensors that may also be included in the system 1100, such as for example, one or more cameras 1005-*a*, 1005-*b*, 1005-*c*, a microphone/speaker 1115, and a mobile computing device 230-*a*, using wired and/or wireless connections 1150 or other communication mediums. The barrier control module 110-*d* (and for example a locking module thereof) may also be in two-way communication with a locking device 120-*b*, which may be positioned at a point along a barrier of a structure 1105 (e.g., a home, a business), such as door 1110. The barrier control module 110-*d* and various modules thereof (e.g., identification module, voice recognition module, facial recognition module, facial detection module, locking module), cameras 1005-*a*, 1005-*b*, 1005-*c*, databases 1060-*a*, potentially identifying information 1065-*a*, locking device 120-*b*, and mobile computing device 230-*a*, may be similar in one or more aspects to barrier control module 110, 110-*a*, 110-*c*, identification module 410, 410-*a*, voice recognition module 1035, facial recognition module 1010, facial detection module 1015, camera 1005, database 1060, potentially identifying information 1065, locking module 415, 415-*a*, locking device 120, 120-*a*, and mobile computing device 230 depicted in FIGS. 2, 4, and 10, among others.

As a first user 1120 approaches the door 1110 of a structure 1105, one of more sensors and/or electronic device (such as one or more cameras 1005-*a*, 1005-*b*, 1005-*c*, a microphone/speaker 1115, and a mobile computing device 230-*a*) may begin to capture information regarding the first user 1120. For example, once the first user 1120 is standing at a first location (e.g., in front of or substantially close to the door 1110), a first camera 1005-*a* may be positioned in a doorway several feet from the first user 1120 to take a full frontal facial view picture and/or video of the facial features of the first user 1120. In one embodiment, a database 1060-*a* may include a profile 1140 relating to the first user 1120. The profile 1140 in one embodiment may include potentially identifying information 1065-*a* relating to the first user's 1140 facial features (e.g., distances between eyes, ears, nose, mouth, widths of eyes, nose, mouth, other geometry of facial features, etc.).

In a further embodiment, the profile 1140 may include potentially identifying information 1065-*a* relating to the first user's 1140 facial features while the first user 1120 is wearing different expressions (smiling, neutral expression, etc.). In a further embodiment, the profile 1140 may include potentially identifying information 1065-*a* relating to the first user's 1140 facial features from different angles. The profile 1140 may also include other potentially identifying information 1065-*a* not relating to facial features. In addition, although FIG. 11 may depict that a profile 1140 is included by the potentially identifying information 1065-*a*, not all information included within a profile 1140 may necessarily be restricted to solely potentially identifying information 1065-*a*.

In one embodiment, the system 1100 may prompt the first user 1120 to perform certain actions desired for identification purposes. For example, where the facial expression of the first user 1120 presents any complication in identifying the first user 1120, the first user 1120 may be prompted—for example through the microphone/speaker 1115, and/or a display (e.g., 210 of FIG. 2) and/or a mobile computing device 230-a of the first user 1120—to change facial expressions (to for example, a smiling or neutral expression) or to speak, show a hand or identifying feature (e.g., hand with fingerprint, exposed arm, tattoo, eye, remove a hat or sunglasses) and/or, and/or perform another action. In addition, in one embodiment, the first user may be prompted to remove or adjust some feature covering or distorting the view of the first user's 1120 face (e.g., sunglasses, long hair), or otherwise presenting some complication in the identifying process.

As mentioned above, in one example, the profile 1140 may include potentially identifying information 1065-a relating to the first user's 1120 facial features at different angles—not just a full frontal view—as well as include three-dimensional facial feature information. In some embodiments, barrier control module 110-d may also automatically employ 3D modeling techniques and/or comparison and mapping using two or more images for facial recognition analysis. For example, the barrier control module 110-d may use the captured views of facial features to accurately build a model of a sufficient portion of a face to enable comparison with the known views and facial feature information contained in profiles 1140 of the database 1160-a. In some embodiments, the two or more 2D and/or 3D images may be captured and/or obtained from one distinct camera. In some embodiments, the two or more images may be captured and/or obtained from two or more distinct cameras.

Alternatively, or in the same embodiment, a second camera 1005-b may be positioned to capture the first user's 1120 facial features at a different angle. For example, if the first camera 1005-a is unable to obtain a full frontal view of the first user's 1120 facial features because the first user's 1120 face is turned to the side, the second camera 1005-b (or another camera) may be positioned to obtain a substantially full frontal view of the first user's 1120 face while turned to the side. Thus, through one or more of the techniques, modules, etc., contemplated herein, and any combination thereof, when the first user's 1120 face is turned (when, for example, the camera 1005-b in the doorway would capture information related to the first user's 1120 facial features), a matching query may still be found in the database 1060-a.

In one example, one or more of the cameras 1005-a, 1005-b, 1005-c and/or in conjunction with the barrier control module 110-d (and in some examples specific modules thereof), may be equipped to determine when a desired view of the first user 1120 (e.g., a full frontal view of the face with a neutral expression) can be captured and to take a picture at that point in time. In addition, one or more cameras 1005-a, 1005-b, 1005-c, may include facial detection capabilities. For example, one or more of the cameras 1005-a, 1005-b, 1005-c, may be capable of determining where within a frame of view is the face of the first user 1120. In a further embodiment, one or more of the cameras 1005-a, 1005-b, 1005-c may track the movement of the first user 1120 as the first user approaches the door 1110 of a home, detecting where in the frame is the first user's face, and take a picture of the first user's 1120 face when a desired perspective of the first user's face is obtainable.

In addition or alternatively, one or more cameras 1005-a, 1005-b, 1005-c may have angles and views 1145 of the first user and may take one or more pictures of the first user's face at different stages or places along the first user's 1120 path to the door 1110, and perhaps without the first user being aware of the cameras 1005-a, 1005-b, 1005-c and/or when the pictures are being taken. In a further embodiment, a third camera 1005-c may be hidden from view by for example blending into an aspect of the environment (such as being position, for example, in a tree 1135 and having similar coloring as the tree) or being discretely positioned within and/or adjacent to a structural or other feature. In another embodiment, one camera may be a decoy (and may be activated to perform one or more operations with and another camera (perhaps hidden) may actually capture information.

Thus for example, if the first user 1120 attempts any deceptive acts with regard to the decoy camera, the actual camera may capture the acts as well as accurate information regarding the first user 1120. The third camera 1005-c may be located a certain distance from the first camera 1005-a and the second camera 1005-b (e.g., 15 feet and 10 feet, respectively). In one embodiment, the third camera 1005-c may be strategically positioned to capture and/or receive information relating the first user 1120—for example, as the first user 1120 exits a vehicle, moves through a predetermined area, and/or to take a photo of the license plate of a vehicle associated with the first user 1120.

In another embodiment, an app on or an operation performed by the first user's mobile computing device 230-a may assist in performing certain operations related to identifying the first user and to the identification module 410-b. For example, in one embodiment, a mobile computing device 230-a may prompt the first user 1120 to take a picture of the first user's 1120 face for purposes of facial recognition. In one embodiment, the app might be equipped with appropriate safeguards to prevent tampering of any picture taken and/or transmitted by the mobile computing device 230-a. In a related embodiment, the app may utilize a location module (e.g., 405) and/or a time-related module to confirm where the first user 1120 is located and/or when the picture is taken (e.g., a GPS feature and a near field communication feature such as Bluetooth).

In one embodiment, a first camera 1005-a may be capable of taking pictures on either side (and/or both sides) of a barrier. For example, in one embodiment, camera 1005-b may face the interior of the home to identify a third user 1130, who may be a young child or a toddler, desiring to access the barrier from the inside of the structure 1105 to exit the structure 1105. The barrier control module 110-d may identify the third user 1130 (using for example the identification module 410-b), determine that the designation of the third user 1130 indicates that the third user 1130 may not access the barrier through the door 1110 to the outside of the structure 1105 (using, for example the designation module 1070-a), and maintain a locked state of the locking device 120-b, or initiate an adjustment of the locking device 120-b to a locked position (using, for example, the locking module 415-b), so that the third user 1130 does not exit the structure 1105.

In some embodiments, the camera 1005-b may be positioned at different points along a vertical axis. In a further embodiment, the camera 1005-b may be adjustable (including automatically adjustable) to change vertical positions or views (and/or horizontal positions and angles), including panning or tilting. For example, in one embodiment, where the third user 1130 has a short height, the camera 1005-b may adjust to the appropriate vertical coordinate for capturing the desired view of the facial (and/or other) features of the third user 1130. In a similar embodiment, a camera 1005-b may adjust to appropriate coordinates to capture identifying information of a pet, for determining for example whether the pet may access a barrier by passing through a doggie door. The camera 1005-b may also provide instructions and/or updates to a user using audio and/or visual components and/or methods to inform the user about the quality of the image captured.

In another embodiment, a light 1030-*a* (e.g., a flash) may be positioned to shine on the first user 1120 in a certain spot to enable the camera 1005-*b* to take well-lit pictures of, for example, facial features (e.g., eye sockets, nose, and chin) of the first user 1120. In some embodiments, the light 1030-*a* may also operate in conjunction with a light detection module (e.g., 1025) embodiment to assist in determining whether additional light is needed and/or desirable. In addition, in one embodiment, a microphone/speaker 1115 may be capable of capturing voice and/or speech/related information to assist in identifying the first user 1120. As mentioned above the barrier control module 110-*d* in some embodiments may consider multiple features and characteristics in order to identify the first user 1120.

At least some of the aforementioned operations with respect to the first user 1120 may also apply with respect to a second user 1125, who may in some examples be accompanying the first user 1120. Moreover, as mentioned above, the barrier control module 110-*d* may initiate a change to the lock of the barrier based at least in part on the determined designation of the second user 1125, and/or both the determined identity and/or designation of both the first user 1120 and the second user 1125. In another example, the barrier control module 110-*d* may identify the second user 1125 but not the first user 1120.

In a further example, based on the identification of the first user 1120, it may be inferred that the second user 1125 (or vice versa) corresponds to a user profile 1140 with a designation for accessing the barrier. For example, the barrier control module 110-*d* may identify a first user 1120 as a child, and information in the profile 1140 relating to the first user 1120 child may allow inferring that the second user 1125 is a babysitter or a guardian, parent, or grandparent (whether identified or not) who may access a barrier, in which case the door 1110 may be unlocked. In some embodiments, where only one of the first user 1120 and the second user 1125 may be identified, the door 1110 may remain locked.

Figure 12:
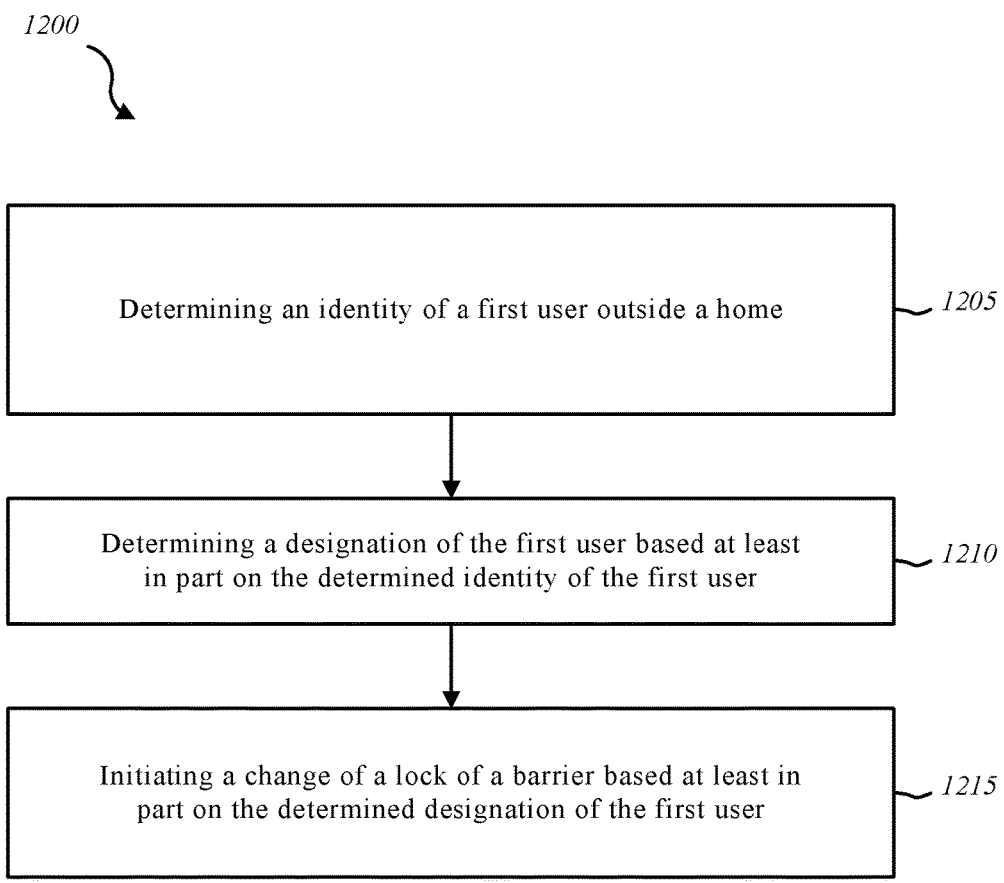
FIG. 12 is a flow diagram illustrating a method for security and/or automation systems.

FIG. 12 is a flow diagram illustrating one embodiment of a method 1200 for controlling access to a home based on user occupancy. In some examples and/or configurations, the method 1200 may be implemented by the home automation system 105 and system 1100 shown in FIGS. 1-3, and 10-11, or more generally by environments 100, 200, 300, 305-*a* shown in FIGS. 1-3, and 11, respectively. In some configurations, method 1200 may be implemented in conjunction with the barrier 115, barrier control module 110, 110-*a*, 110-*c*, 110-*c*, identification module 410, 410-*a*, 410-*b*, voice recognition module 1035, 1035-*a*, facial recognition module 1010, 1010-*a*, facial detection module 1015, 1015-*a*, cameras 1005, 1005-*a*, 1005-*b*, 1005-*c*, databases 1060, 1060-*a*, potentially identifying information 1065, 1065-*a*, locking module 415, 415-*a*, 415-*b*, locking device 120, 120-*a*, 120-*b*, and mobile computing device 230, 230-*a* depicted in FIGS. 1-2, 4, and 10-11, among others.

At block 1205, method 1200 may include determining an identity of a first user outside a home. As described above, according to embodiment, the identity of the first user may be determined in a variety of ways and using a number of modules, sensors, and other devices. Some embodiments may utilize at least one camera and the identity of the first user may be based at least in part on visual data of the user captured by the at least one camera, as well as by other scanners and devices. Such data may relate to, for example, changeable features, facial features, body features, skin textures, eye patterns and features, voice, fingerprints, mobile electronic device identifier, etc. In one particular embodiment, such data may be captured and/or transmitted using a mobile electronic device carried by the user. Some examples utilizing a mobile device may involve certain cost installation benefits (e.g., instead of using standalone devices for facial recognition, voice recognition, GPS, fingerprint, iris recognition, and retina recognition operations, etc.). Some method 1200 embodiments utilizing cameras may involve multiple views of the first users (taken for example at different distances and angles).

At block 1210, the method 1200 may include determining a designation of the first user based at least in part on the determined identity of the first user. As mentioned above, in some examples designations may include different user categories and levels relating to the accessibility of particular barriers and times when the barrier may be accessed. In one example, the designations may be indicated in a database of user profiles, with each profile having a corresponding designations. In another embodiment, unidentified users may be given a designation based on certain captured data—for example a designation indicating that the unidentified user may not access any barrier at any time.

At block 1215, the method 1200 may include initiating a change of a lock of a barrier based at least in part on the determined designation of the first user. In some examples, method 1200 may be directed to adjusting the lock of a door based on the identity of a person or user outside the door. For example, in one embodiment of method 1200, the initiating step shown in block 1215 may also include unlocking the locking mechanism if the user is located inside or outside the home and has been identified and has a designation indicating that the barrier is accessible, and maintaining the door locked if the user is located outside the home and is not identified, or is identified and has a designation indicating that the barrier is accessible. In one embodiment of method 1200, an identified user not designated to access a barrier may not access the barrier even if possessing a key to a door lock (e.g., for scenarios where the key may be stolen).

Figure 13:
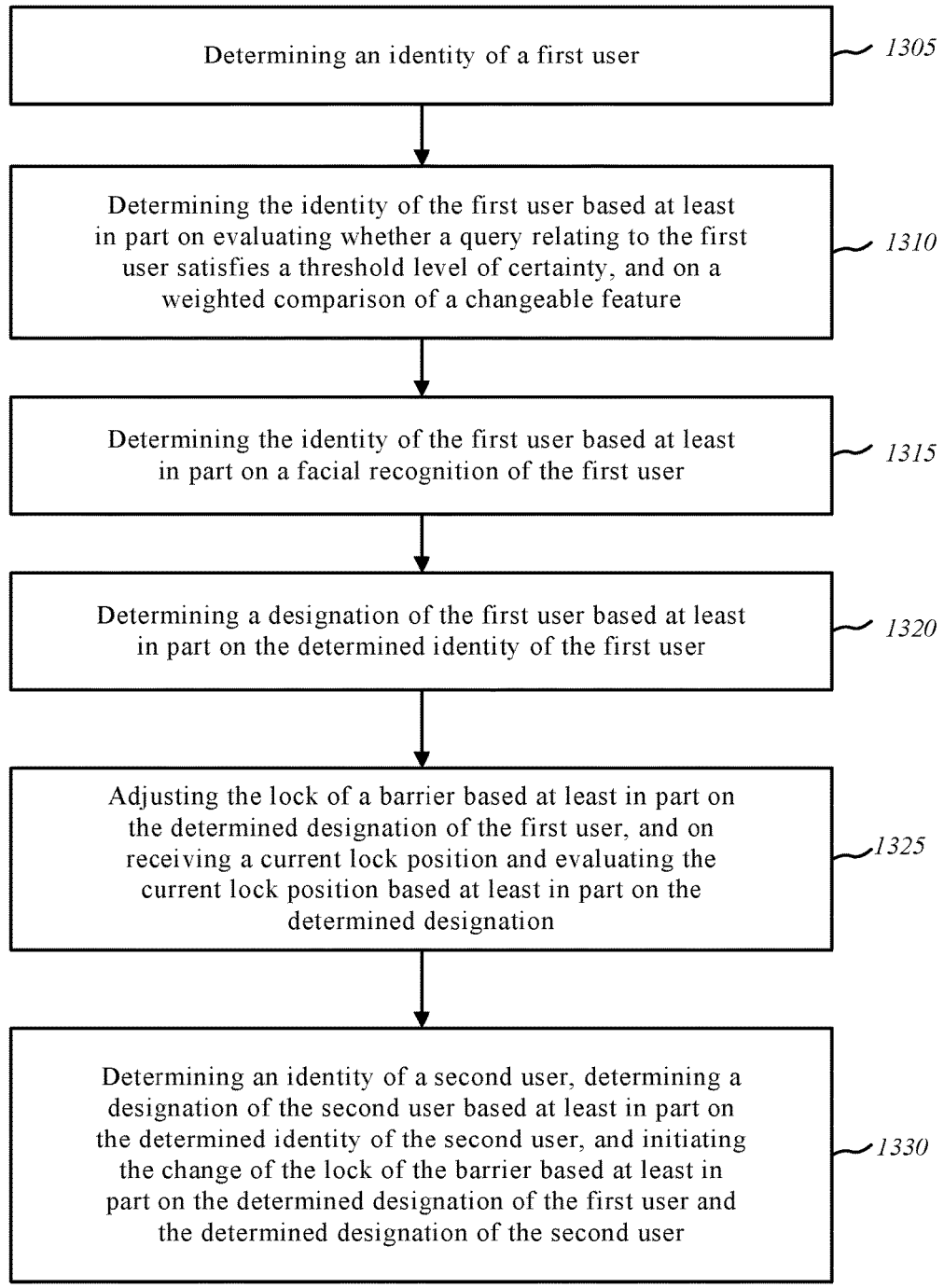
FIG. 13 is another flow diagram illustrating another method for security and/or automation systems.

FIG. 13 is a flow diagram illustrating one embodiment of a method 1300 for controlling access to a home based on user occupancy. In some examples and/or configurations, the method 1300 may be implemented by the home automation system 105 and system 1100 shown in FIGS. 1-3, and 10-11, or more generally by environments 100, 200, 300, 305-*a* shown in FIGS. 1-3, and 11, respectively. In some configurations, method 1300 may be implemented in conjunction with the barrier 115, barrier control module 110, 110-*a*, 110-*c*, 110-*c*, identification module 410, 410-*a*, 410-*b*, voice recognition module 1035, 1035-*a*, facial recognition module 1010, 1010-*a*, facial detection module 1015, 1015-*a*, cameras 1005, 1005-*a*, 1005-*b*, 1005-*c*, databases 1060, 1060-*a*, potentially identifying information 1065, 1065-*a*, locking module 415, 415-*a*, 415-*b*, locking device 120, 120-*a*, 120-*b*, and mobile computing device 230, 230-*a* depicted in FIGS. 1-2, 4, and 10-11, among others.

At block 1305, method 1300 may include determining an identity of a first user. The identity of the first user may be determined at block 1305 in a similar manner as described above with respect to block 1205 of method 1200. However, in some examples of method 1300, the first user of block 1305 may be located outside of a home or inside of a home.

At block 1310, the method 1300 may include determining the identity of the first user based at least in part on evaluating whether a query relating to the first user satisfies a threshold level of certainty, and on a weighted comparison of a changeable feature. In one embodiment, the method 1300 may include a single query and in other embodiments the method 1300 may include a plurality of queries. In one embodiment, algorithms, comparisons, calculations, and/or other operations placing greater or lesser weight on particular queries (e.g., those relating to changeable features) and keeping track of the number of correct queries may assist in determining whether a threshold confidence level is satisfied. In one method embodiment, a door may remain in a locked state until correct responses to the queries satisfy a threshold confidence or certainty level.

At block 1315, the method 1300 may include determining the identity of the first user based at least in part on a facial recognition of the first user. In one embodiment, block 1315 may include captured information relating to the first user's facial features, and querying a database for matching information corresponding to a profile. Some query embodiments may also distinguish between two dimensional and three dimensional facial features.

Other method 1300 embodiments may incorporate other steps for identifying the first user, not necessarily related to facial recognition. For example, one method 1300 embodiment may recognize whether a person has a body, and/or specific features thereof (e.g., legs, mid-section, etc.), and whether the features are of a particular user. For example, similar to the step at block 1315 relating to facial recognition, in one method 1300 embodiment a database may be queried for matching information corresponding to a profile regarding such body features (e.g., length of legs, width of hips, etc.). In one embodiment, a query may relate to the voice of a person and whether it is recognized. In another embodiment, a query may relate to the geolocation of a user—for example, by recognizing a phone in the doorway as that of a particular user. Some embodiments may utilize a mobile device and related technology (e.g., Bluetooth, Wi-Fi) to either send a query or receive a query response. In one example, matching queries may assist in identifying the first user.

In another embodiment, the method 1300 may include determining the identity of a user based at least in part on receiving a first image and a second image of the user. In a further embodiment, the first image and the second image may include any of picture data, or video data, or a combination thereof. In a further embodiment, the first image may be based on a first viewpoint and the second image may be based on a second viewpoint different from the first viewpoint. In some examples, different viewpoints may be obtained by the user changing positions, and/or by the camera zooming, and/or by the camera adjusting its field of view, and/or the camera adjusting the direction it is facing, and/or by the camera changing vertical and/or horizontal positions.

In a further embodiment, the first image may be captured by a first camera and the second image may be captured by a second camera. In a further embodiment, the first camera and the second camera may be separated by a predetermined distance, and the first camera may capture the first image at a first distance away from the barrier, and the second camera may capture the second image a second distance away from the barrier (similar to the depiction of cameras 1005-*a* and 1005-*c* in FIG. 11). Relatedly, the method 1300 may include taking pictures of a user (and in one example, facial features of a user) at predetermined distances (e.g., 10 feet, 20 feet, 30 feet) from a door. In a further embodiment, the method 1300 may include comparing the first image, or the second image, or a combination thereof, with a database of identifying information.

In a further embodiment, the first image or the second image, and the identifying information may include any of: an image of a skin patch, or a geometry of facial features, or a facial image of a user with an expression, or a facial image of a user with a perspective, or a height, or a weight, or a voice, or a body feature, or a key code, or a combination thereof, among other things. Thus, as mentioned above, some method embodiments may utilize 3D modeling techniques and skin texture analysis, and body recognition techniques, and respective queries may relate thereto.

In other embodiments, the method 1300 may include detecting a face of the first user in a camera's field of view, and tracking the face as the first user moves in the camera's field of view. In another embodiment, the method 1300 may include determining if a facial feature is present in a camera's field of view, and capturing a first image based at least in part on determining if the facial feature is present. In another method embodiment, the method 1300 may include detecting an ambient light level, and illuminating a facial feature of a user based at least in part on the detected ambient light level (utilizing, for example, a sensor for detecting ambient light level and a light configured to illuminate the facial features of a user).

At block 1320, the method 1300 may include determining a designation of the first user based at least in part on the determined identity of the first user. Block 1325 may include adjusting the lock of a barrier based at least in part on the determined designation of the first user, and on receiving a current lock position and evaluating the current lock position based at least in part on the determined designation. At block 1330, the method may include determining an identity of a second user, determining a designation of the second user based at least in part on the determined identity of the second user, and initiating the change of the lock of the barrier based at least in part on the determined designation of the first user and the determined designation of the second user. Thus, embodiments of the method 1300 may also include the step of initiating a change of a lock of a barrier based at least in part on the determined designation of the first user, and/or maintaining a current state of a lock.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for security and/or automation systems for controlling access to a home, comprising:
    detecting a face of the first user in a field of view of a first camera or a second camera, wherein the first camera and the second camera are separated by a predetermined distance;
    capturing, based at least in part on the detecting, by the first camera a first image of the face of the first user at a first location a first distance away from the barrier, and by the second camera a second image of the face of the first user at a second location a second distance away from the barrier;
    comparing, based at least in part on the capturing, the first image, or the second image, or a combination thereof with a database of identifying information;
    determining an identity of a first user outside a home based at least in part on the comparing, and based at least in part on a facial recognition of the first user;
    determining a designation of the first user based at least in part on the determined identity of the first user; and
    initiating a change of a lock of a barrier based at least in part on the determined designation of the first user.

2. The method of claim 1, wherein initiating the change of the lock is based at least in part on receiving a current lock position and evaluating the current lock position based at least in part on the determined designation.

3. The method of claim 1, wherein initiating the change of the lock comprises:
    adjusting the lock.

4. The method of claim 1, wherein determining the identity of the first user comprises:
    evaluating whether a query relating to the first user satisfies a threshold level of certainty.

5. The method of claim 4, wherein the evaluating is based at least in part on a weighted comparison of a changeable feature.

6. The method of claim 5, wherein the changeable feature comprises:
    any of a hair color, or a hair style, or a hair length, or eye glasses, or an eye color, or a hat, or clothing, or a combination thereof.

7. The method of claim 1, wherein determining the identity of the first user is based at least in part on detecting a portable device associated with the first user.

8. The method of claim 1, further comprising
    determining an identity of a second user;
    determining a designation of the second user based at least in part on the determined identity of the second user; and
    initiating the change of the lock of the barrier based at least in part on the determined designation of the first user and the determined designation of the second user.

9. The method of claim 1, wherein at least one of the first camera or the second camera is hidden from a view at at least one of the barrier, the first position, and the second position.

10. The method of claim 1, wherein the facial recognition further comprises:
    tracking the face as the first user moves in the camera's field of view.

11. The method of claim 1, wherein the facial recognition comprises:
    determining if a facial feature is present in the field of view of the first camera or the second camera; and
    capturing a first image based at least in part on determining if the facial feature is present.

12. The method of claim 1, further comprising:
    detecting an ambient light level; and
    illuminating a facial feature of a user based on the detected ambient light level as part of the facial recognition.

13. The method of claim 1, wherein the first image and the second image comprise:
    any of picture data, or video data, or a combination thereof.

14. The method of claim 1, wherein the first image is based on a first viewpoint and the second image is based on a second viewpoint different from the first viewpoint.

15. The method of claim 1, wherein the first image is received from a first camera and the second image is received from a second camera.

16. The method of claim 1, wherein the first image or the second image, and the identifying information include any of: an image of a skin patch, or a geometry of facial features, or a facial image of a user with an expression, or a facial image of a user with a perspective, or a height, or a weight, or a voice, or a body feature, or a key code, or a combination thereof.

17. An apparatus for security and/or automation systems, comprising:
    a processor;
    memory in electronic communication with the processor; and
    instructions stored in the memory, the instructions being executable by the processor to:
    detecting a face of the first user in a field of view of a first camera or a second camera, wherein the first camera and the second camera are separated by a predetermined distance;
    capturing, based at least in part on the detecting, by a first camera a first image of the face of the first user at a first location a first distance away from the barrier, and by the second camera a second image of the face of the first user at a second location a second distance away from the barrier;

comparing, based at least in part on the capturing, the first image, or the second image, or a combination thereof with a database of identifying information;

determining an identity of a first user outside a home based at least in part on the comparing, and based at least in part on a facial recognition of the first user;

determine a designation of the first user based at least in part on the determined identity of the first user; and initiate a change of a lock of a barrier based at least in part on the determined designation of the first user.

18. A non-transitory computer-readable medium storing computer-executable code, the code executable by a processor to:

determine an identity of a first user outside a home based at least in part on a facial recognition of the first user, wherein the facial recognition comprises:

detect a face of the first user in a field of view of a first camera or a second camera, wherein the first camera and the second camera are separated by a predetermined distance;

capture, based at least in part on the detecting, by the first camera a first image of the face of the first user at a first location a first distance away from the barrier, and by the second camera a second image of the face of the first user at a second location a second distance away from the barrier;

compare, based at least in part on the capturing, the first image, or the second image, or a combination thereof with a database of identifying information;

determine an identity of a first user outside a home based at least in part on the comparing, and based at least in part on a facial recognition of the first user;

determine a designation of the first user based at least in part on the determined identity of the first user; and initiate a change of a lock of a barrier based at least in part on the determined designation of the first user.

* * * * *